(12) United States Patent
Higuchi et al.

(10) Patent No.: US 8,713,489 B2
(45) Date of Patent: Apr. 29, 2014

(54) SIMULATION PARAMETER CORRECTION TECHNIQUE

(75) Inventors: Hiroyuki Higuchi, Kawasaki (JP);
Hidetoshi Matsuoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 297 days.

(21) Appl. No.: 13/052,243

(22) Filed: Mar. 21, 2011

(65) Prior Publication Data

US 2011/0295403 A1 Dec. 1, 2011

(30) Foreign Application Priority Data

May 31, 2010 (JP) ................................. 2010-125218

(51) Int. Cl.
*G06F 17/50* (2006.01)
*G01R 27/28* (2006.01)
*G01R 31/10* (2006.01)
*G01R 31/14* (2006.01)

(52) U.S. Cl.
CPC ........ *G06F 17/5009* (2013.01); *G06F 17/5045* (2013.01); *G06F 17/5081* (2013.01); *G06F 2217/02* (2013.01); *G06F 2217/10* (2013.01); *G06F 2217/12* (2013.01); *G06F 2217/14* (2013.01); *G01R 27/28* (2013.01); *G01R 31/10* (2013.01); *G01R 31/14* (2013.01)
USPC ................. 716/54; 716/51; 716/55; 716/111; 716/136; 700/96; 700/98; 700/109; 700/120; 700/121; 703/2; 703/14; 702/118; 702/181

(58) Field of Classification Search
CPC ............ G06F 17/5009; G06F 17/5045; G06F 17/5081; G06F 17/01; G06F 2217/02; G06F 2217/10; G06F 2217/12; G06F 2217/14; G06F 19/00; G01R 27/28; G01R 31/10; G01R 31/14

USPC ........... 716/54, 51, 55, 111, 136; 700/96, 98, 700/109, 120, 121; 703/2, 14; 702/118, 181
See application file for complete search history.

(56) References Cited

U.S. PATENT DOCUMENTS 6,000,833 A * 12/1999 Gershenfeld et al. ........... 84/600
7,177,783 B2   2/2007 Wu et al. ........................... 703/2
(Continued)

FOREIGN PATENT DOCUMENTS

| JP | 04286905 A * 10/1992 | ............. G01B 11/00 |
| JP | 2001-291778   10/2001 | |

OTHER PUBLICATIONS

Taiwanese Office Action issued Oct. 15, 2013 in corresponding Taiwanese Application No. 100109709.

*Primary Examiner* — Phallaka Kik
(74) *Attorney, Agent, or Firm* — Staas & Halsey LLP

(57) ABSTRACT

A parameter correction method includes: obtaining, from a variability-aware simulation, a simulation result value of a predetermined product performance for a reference candidate value set concerning statistics of predetermined product characteristics; calculating a likelihood by substituting the reference candidate value set, the obtained simulation result value, statistics of measurement values of the predetermined product characteristics and a measurement value of the predetermined product performance into a likelihood function that is defined from a probability density function for the statistics of the predetermined product characteristics and a probability density function for the predetermined product performance, and is a function to calculate a combined likelihood of the statistics of the predetermined product characteristics and the predetermined product performance; and searching for a reference candidate value set in case where the calculated likelihood becomes maximum, by carrying out the obtaining and the calculating plural times while changing the reference candidate value set.

5 Claims, 23 Drawing Sheets

(56) References Cited

U.S. PATENT DOCUMENTS

| | | | |
|---|---|---|---|
| 7,383,128 B2* | 6/2008 | Chandler | 702/1 |
| 7,449,946 B1 | 11/2008 | Hoover | 330/149 |
| 7,921,402 B2* | 4/2011 | He | 716/136 |
| 8,010,535 B2* | 8/2011 | Taylor et al. | 707/748 |
| 8,037,430 B2* | 10/2011 | Papanikolaou et al. | 716/56 |
| 8,204,714 B2* | 6/2012 | Lu | 702/181 |
| 2002/0095273 A1 | 7/2002 | Tanizawa | |
| 2004/0237061 A1* | 11/2004 | Kahng et al. | 716/19 |
| 2005/0108254 A1* | 5/2005 | Zhang | 707/100 |
| 2006/0111844 A1* | 5/2006 | Chandler | 702/1 |
| 2008/0005707 A1* | 1/2008 | Papanikolaou et al. | 716/4 |
| 2009/0248767 A1* | 10/2009 | Moriya | 708/200 |
| 2009/0299704 A1* | 12/2009 | Kozma et al. | 703/2 |
| 2010/0037192 A1* | 2/2010 | Sugiyama | 716/6 |
| 2011/0213587 A1* | 9/2011 | Lu | 702/181 |
| 2011/0296361 A1* | 12/2011 | Tanaka | 716/108 |
| 2012/0151422 A1* | 6/2012 | White et al. | 716/54 |
| 2013/0054207 A1* | 2/2013 | Souche et al. | 703/2 |

\* cited by examiner

| MEASUREMENT DATA (LOAD, Vth) | $D_{11}$ | $D_{12}$ | ... | $D_{1n}$ |
|---|---|---|---|---|
| MEASUREMENT DATA (LOAD, Ion) | $D_{21}$ | $D_{22}$ | ... | $D_{2n}$ |
| MEASUREMENT DATA (DRIVER, Vth) | $D_{31}$ | $D_{32}$ | ... | $D_{3n}$ |
| MEASUREMENT DATA (DRIVER, Ion) | $D_{41}$ | $D_{42}$ | ... | $D_{4n}$ |
| MEASUREMENT DATA (TRANSFER, Vth) | $D_{51}$ | $D_{52}$ | ... | $D_{5n}$ |
| MEASUREMENT DATA (TRNSFER, Ion) | $D_{61}$ | $D_{62}$ | ... | $D_{6n}$ |

| y' |

| $\sigma_1$ | $\sigma_2$ |
|---|---|
| $\sigma_3$ | $\sigma_4$ |
| $\sigma_5$ | $\sigma_6$ |
| $\sigma_7$ | $\sigma_8$ |
| $\sigma_9$ | $\sigma_{10}$ |
| $\sigma_{11}$ | $\sigma_{12}$ |

| $\sigma_y$ |

FIG.7

| | $\mu(D_1)$ | $\sigma(D_1)$ | |
|---|---|---|---|
| $p_1'$ | $\mu(D_1)$ | $\sigma(D_1)$ | $p_2'$ |
| $p_3'$ | $\mu(D_2)$ | $\sigma(D_2)$ | $p_4'$ |
| $p_5'$ | $\mu(D_3)$ | $\sigma(D_3)$ | $p_6'$ |
| $p_7'$ | $\mu(D_4)$ | $\sigma(D_4)$ | $p_8'$ |
| $p_9'$ | $\mu(D_5)$ | $\sigma(D_5)$ | $p_{10}'$ |
| $p_{11}'$ | $\mu(D_6)$ | $\sigma(D_6)$ | $p_{12}'$ |

FIG.8

| | 1 | 2 | 3 | 4 | 5 | 6 | 7 | 8 | 9 | 10 | 11 | 12 | YIELD |
|---|---|---|---|---|---|---|---|---|---|---|---|---|---|
| STATISTICS OF MEASUREMENT VALUES | $p_1'$ | $p_2'$ | $p_3'$ | $p_4'$ | $p_5'$ | $p_6'$ | $p_7'$ | $p_8'$ | $p_9'$ | $p_{10}'$ | $p_{11}'$ | $p_{12}'$ | $y'$ |
| ERROR STANDARD DEVIATION | $\sigma_1$ | $\sigma_2$ | $\sigma_3$ | $\sigma_4$ | $\sigma_5$ | $\sigma_6$ | $\sigma_7$ | $\sigma_8$ | $\sigma_9$ | $\sigma_{10}$ | $\sigma_{11}$ | $\sigma_{12}$ | $\sigma_y$ |
| CORRECTION VALUE | $p_1'$ | $p_2'$ | $p_3'$ | $p_4'$ | $p_5'$ | $p_6'$ | $p_7'$ | $p_8'$ | $p_9'$ | $p_{10}'$ | $p_{11}'$ | $p_{12}'$ | — |

FIG.9

| | 1 | 2 | 3 | 4 | 5 | 6 | 7 | 8 | 9 | 10 | 11 | 12 | YIELD |
|---|---|---|---|---|---|---|---|---|---|---|---|---|---|
| STATISTICS OF MEASUREMENT VALUES | $p_1'$ | $p_2'$ | $p_3'$ | $p_4'$ | $p_5'$ | $p_6'$ | $p_7'$ | $p_8'$ | $p_9'$ | $p_{10}'$ | $p_{11}'$ | $p_{12}'$ | $y'$ |
| ERROR STANDARD DEVIATION | $\sigma_1$ | $\sigma_2$ | $\sigma_3$ | $\sigma_4$ | $\sigma_5$ | $\sigma_6$ | $\sigma_7$ | $\sigma_8$ | $\sigma_9$ | $\sigma_{10}$ | $\sigma_{11}$ | $\sigma_{12}$ | $\sigma_y$ |
| CORRECTION VALUE | $p_1'$ | $p_2'$ | $p_3'$ | $p_4'$ | $p_5'$ | $p_6'$ | $p_7'$ | $p_8'$ | $p_9'$ | $p_{10}'$ | $p_{11}'$ | $p_{12}'$ | $y^0$ |

FIG.10

| 1 | 2 | 3 | 4 | 5 | 6 | 7 | 8 | 9 | 10 | 11 | 12 | YIELD |
|---|---|---|---|---|---|---|---|---|---|---|---|---|
| $p_1 + \Delta p$ | $p_2$ | $p_3$ | $p_4$ | $p_5$ | $p_6$ | $p_7$ | $p_8$ | $p_9$ | $p_{10}$ | $p_{11}$ | $p_{12}$ | $y + delta$ |

FIG.13

| | 1 | 2 | 3 | 4 | 5 | 6 | 7 | 8 | 9 | 10 | 11 | 12 |
|---|---|---|---|---|---|---|---|---|---|---|---|---|
| CORRECTION VALUE 0 | $p_1'$ | $p_2'$ | $p_3'$ | $p_4'$ | $p_5'$ | $p_6'$ | $p_7'$ | $p_8'$ | $p_9'$ | $p_{10}'$ | $p_{11}'$ | $p_{12}'$ |
| SLOPE | $\partial L/\partial p_1$ | $\partial L/\partial p_2$ | $\partial L/\partial p_3$ | $\partial L/\partial p_4$ | $\partial L/\partial p_5$ | $\partial L/\partial p_6$ | $\partial L/\partial p_7$ | $\partial L/\partial p_8$ | $\partial L/\partial p_9$ | $\partial L/\partial p_{10}$ | $\partial L/\partial p_{11}$ | $\partial L/\partial p_{12}$ |

FIG.15

| | 1 | 2 | 3 | 4 | 5 | 6 | 7 | 8 | 9 | 10 | 11 | 12 | YIELD |
|---|---|---|---|---|---|---|---|---|---|---|---|---|---|
| STATISTICS OF MEASUREMENT VALUES | $p_1'$ | $p_2'$ | $p_3'$ | $p_4'$ | $p_5'$ | $p_6'$ | $p_7'$ | $p_8'$ | $p_9'$ | $p_{10}'$ | $p_{11}'$ | $p_{12}'$ | $y'$ |
| ERROR STANDARD DEVIATION | $\sigma_1$ | $\sigma_2$ | $\sigma_3$ | $\sigma_4$ | $\sigma_5$ | $\sigma_6$ | $\sigma_7$ | $\sigma_8$ | $\sigma_9$ | $\sigma_{10}$ | $\sigma_{11}$ | $\sigma_{12}$ | $\sigma_y$ |
| CORRECTION VALUE 0 | $p_1'$ | $p_2'$ | $p_3'$ | $p_4'$ | $p_5'$ | $p_6'$ | $p_7'$ | $p_8'$ | $p_9'$ | $p_{10}'$ | $p_{11}'$ | $p_{12}'$ | $y^0$ |
| CORRECTION VALUE 1 | $p_1^1$ | $p_2^1$ | $p_3^1$ | $p_4^1$ | $p_5^1$ | $p_6^1$ | $p_7^1$ | $p_8^1$ | $p_9^1$ | $p_{10}^1$ | $p_{11}^1$ | $p_{12}^1$ | |

FIG.16

| | 1 | 2 | 3 | 4 | 5 | 6 | 7 | 8 | 9 | 10 | 11 | 12 | YIELD |
|---|---|---|---|---|---|---|---|---|---|---|---|---|---|
| STATISTICS OF MEASUREMENT VALUES | $p_1'$ | $p_2'$ | $p_3'$ | $p_4'$ | $p_5'$ | $p_6'$ | $p_7'$ | $p_8'$ | $p_9'$ | $p_{10}'$ | $p_{11}'$ | $p_{12}'$ | $y'$ |
| ERROR STANDARD DEVIATION | $\sigma_1$ | $\sigma_2$ | $\sigma_3$ | $\sigma_4$ | $\sigma_5$ | $\sigma_6$ | $\sigma_7$ | $\sigma_8$ | $\sigma_9$ | $\sigma_{10}$ | $\sigma_{11}$ | $\sigma_{12}$ | $\sigma_y$ |
| CORRECTION VALUE 0 | $p_1'$ | $p_2'$ | $p_3'$ | $p_4'$ | $p_5'$ | $p_6'$ | $p_7'$ | $p_8'$ | $p_9'$ | $p_{10}'$ | $p_{11}'$ | $p_{12}'$ | $y^0$ |
| CORRECTION VALUE 1 | $p_1^1$ | $p_2^1$ | $p_3^1$ | $p_4^1$ | $p_5^1$ | $p_6^1$ | $p_7^1$ | $p_8^1$ | $p_9^1$ | $p_{10}^1$ | $p_{11}^1$ | $p_{12}^1$ | $y^1$ |

FIG.17

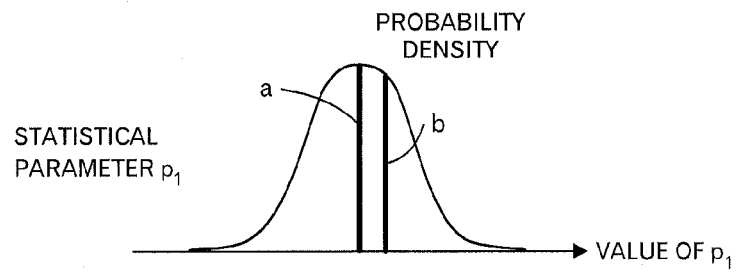
FIG.20A STATISTICAL PARAMETER $p_1$
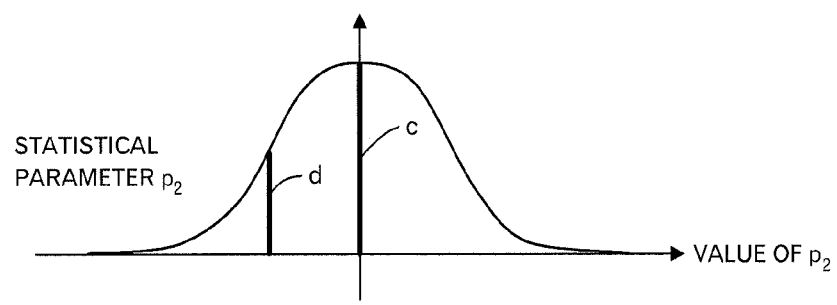
FIG.20B STATISTICAL PARAMETER $p_2$
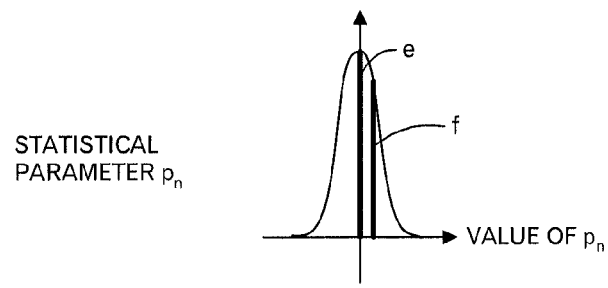
FIG.20C STATISTICAL PARAMETER $p_n$
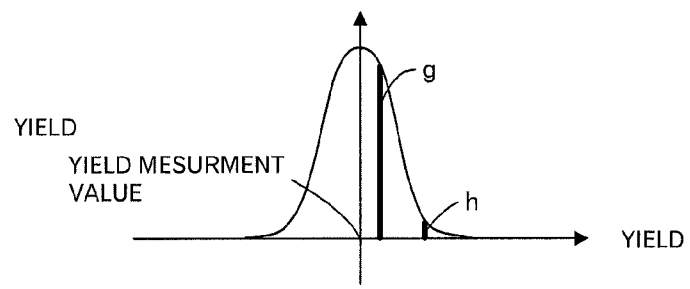
FIG.20D YIELD YIELD MESURMENT VALUE

| MEASUREMENT DATA (LOAD, Vth) | $D_{11}$ | $D_{12}$ | $\cdots$ | $D_{1n}$ |
|---|---|---|---|---|
| MEASUREMENT DATA (LOAD, Ion) | $D_{21}$ | $D_{22}$ | $\cdots$ | $D_{2n}$ |
| MEASUREMENT DATA (DRIVER, Vth) | $D_{31}$ | $D_{32}$ | $\cdots$ | $D_{3n}$ |
| MEASUREMENT DATA (DRIVER, Ion) | $D_{41}$ | $D_{42}$ | $\cdots$ | $D_{4n}$ |
| MEASUREMENT DATA (TRANSFER, Vth) | $D_{51}$ | $D_{52}$ | $\cdots$ | $D_{5n}$ |
| MEASUREMENT DATA (TRNSFER, Ion) | $D_{61}$ | $D_{62}$ | $\cdots$ | $D_{6n}$ |

FIG.23

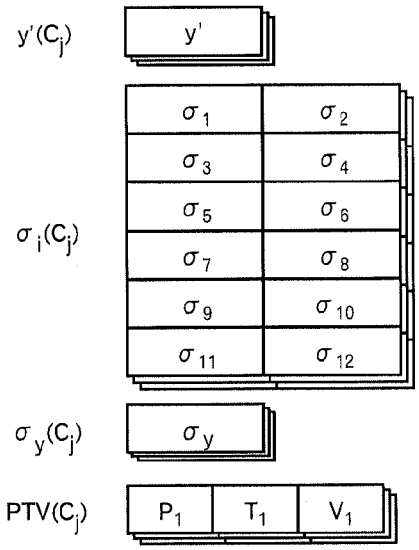

FIG.24

| $p_1'(C_j)$ | $\mu_j(D_1)$ | $\sigma_j(D_1)$ | $p_2'(C_j)$ |
|---|---|---|---|
| $p_3'(C_j)$ | $\mu_j(D_2)$ | $\sigma_j(D_2)$ | $p_4'(C_j)$ |
| $p_5'(C_j)$ | $\mu_j(D_3)$ | $\sigma_j(D_3)$ | $p_6'(C_j)$ |
| $p_7'(C_j)$ | $\mu_j(D_4)$ | $\sigma_j(D_4)$ | $p_8'(C_j)$ |
| $p_9'(C_j)$ | $\mu_j(D_5)$ | $\sigma_j(D_5)$ | $p_{10}'(C_j)$ |
| $p_{11}'(C_j)$ | $\mu_j(D_6)$ | $\sigma_j(D_6)$ | $p_{12}'(C_j)$ |

FIG.25

| COEFFICIENT CORRECTION VALUE | | | | | | | | | | | | |
|---|---|---|---|---|---|---|---|---|---|---|---|---|
| $k_{11}^0$ | $k_{21}^0$ | $k_{31}^0$ | $k_{41}^0$ | $k_{51}^0$ | $k_{61}^0$ | $k_{71}^0$ | $k_{81}^0$ | $k_{91}^0$ | $k_{101}^0$ | $k_{111}^0$ | $k_{121}^0$ |
| $k_{12}^0$ | $k_{22}^0$ | $k_{32}^0$ | $k_{42}^0$ | $k_{52}^0$ | $k_{62}^0$ | $k_{72}^0$ | $k_{82}^0$ | $k_{92}^0$ | $k_{102}^0$ | $k_{112}^0$ | $k_{122}^0$ |
| $k_{13}^0$ | $k_{23}^0$ | $k_{33}^0$ | $k_{43}^0$ | $k_{53}^0$ | $k_{63}^0$ | $k_{73}^0$ | $k_{83}^0$ | $k_{93}^0$ | $k_{103}^0$ | $k_{113}^0$ | $k_{123}^0$ |
| $k_{14}^0$ | $k_{24}^0$ | $k_{34}^0$ | $k_{44}^0$ | $k_{54}^0$ | $k_{64}^0$ | $k_{74}^0$ | $k_{84}^0$ | $k_{94}^0$ | $k_{104}^0$ | $k_{114}^0$ | $k_{124}^0$ |

FIG.26

| | 1 | 2 | 3 | 4 | 5 | 6 | 7 | 8 | 9 | 10 | 11 | 12 | YIELD |
|---|---|---|---|---|---|---|---|---|---|---|---|---|---|
| STATISTICS OF MEASUREMENT VALUES | $p_1'$ | $p_2'$ | $p_3'$ | $p_4'$ | $p_5'$ | $p_6'$ | $p_7'$ | $p_8'$ | $p_9'$ | $p_{10}'$ | $p_{11}'$ | $p_{12}'$ | $y'$ |
| ERROR STANDARD DEVIATION | $\sigma_1$ | $\sigma_2$ | $\sigma_3$ | $\sigma_4$ | $\sigma_5$ | $\sigma_6$ | $\sigma_7$ | $\sigma_8$ | $\sigma_9$ | $\sigma_{10}$ | $\sigma_{11}$ | $\sigma_{12}$ | $\sigma_y$ |
| STATISTICAL PARAMETER VALUE | | | | | | | | | | | | | |

| P₁ | T₁ | V₁ |

| | 1 | 2 | 3 | 4 | 5 | 6 | 7 | 8 | 9 | 10 | 11 | 12 | YIELD |
|---|---|---|---|---|---|---|---|---|---|---|---|---|---|
| STATISTICS OF MEASUREMENT VALUES | $p_1'$ | $p_2'$ | $p_3'$ | $p_4'$ | $p_5'$ | $p_6'$ | $p_7'$ | $p_8'$ | $p_9'$ | $p_{10}'$ | $p_{11}'$ | $p_{12}'$ | $y'$ |
| ERROR STANDARD DEVIATION | $\sigma_1$ | $\sigma_2$ | $\sigma_3$ | $\sigma_4$ | $\sigma_5$ | $\sigma_6$ | $\sigma_7$ | $\sigma_8$ | $\sigma_9$ | $\sigma_{10}$ | $\sigma_{11}$ | $\sigma_{12}$ | $\sigma_y$ |
| STATISTICAL PARAMETER VALUE | $p_1^0$ | $p_2^0$ | $p_3^0$ | $p_4^0$ | $p_5^0$ | $p_6^0$ | $p_7^0$ | $p_8^0$ | $p_9^0$ | $p_{10}^0$ | $p_{11}^0$ | $p_{12}^0$ | |

FIG.28

| P₁ | T₁ | V₁ |

| | 1 | 2 | 3 | 4 | 5 | 6 | 7 | 8 | 9 | 10 | 11 | 12 | YIELD |
|---|---|---|---|---|---|---|---|---|---|---|---|---|---|
| STATISTICS OF MEASUREMENT VALUES | $p_1'$ | $p_2'$ | $p_3'$ | $p_4'$ | $p_5'$ | $p_6'$ | $p_7'$ | $p_8'$ | $p_9'$ | $p_{10}'$ | $p_{11}'$ | $p_{12}'$ | $y'$ |
| ERROR STANDARD DEVIATION | $\sigma_1$ | $\sigma_2$ | $\sigma_3$ | $\sigma_4$ | $\sigma_5$ | $\sigma_6$ | $\sigma_7$ | $\sigma_8$ | $\sigma_9$ | $\sigma_{10}$ | $\sigma_{11}$ | $\sigma_{12}$ | $\sigma_y$ |
| STATISTICAL PARAMETER VALUE | $p_1^0$ | $p_2^0$ | $p_3^0$ | $p_4^0$ | $p_5^0$ | $p_6^0$ | $p_7^0$ | $p_8^0$ | $p_9^0$ | $p_{10}^0$ | $p_{11}^0$ | $p_{12}^0$ | $y^0$ |

| STATISTICAL PARAMETER VALUE | 1 | 2 | 3 | 4 | 5 | 6 | 7 | 8 | 9 | 10 | 11 | 12 | YIELD |
|---|---|---|---|---|---|---|---|---|---|---|---|---|---|
| | $p_{1+}^0$ | $p_2^0$ | $p_3^0$ | $p_4^0$ | $p_5^0$ | $p_6^0$ | $p_7^0$ | $p_8^0$ | $p_9^0$ | $p_{10}^0$ | $p_{11}^0$ | $p_{12}^0$ | $y^0$+delta |

FIG.35

| $\partial L/\partial k_{11}$ | $\partial L/\partial k_{21}$ | $\partial L/\partial k_{31}$ | $\partial L/\partial k_{41}$ | $\partial L/\partial k_{51}$ | $\partial L/\partial k_{61}$ | $\partial L/\partial k_{71}$ | $\partial L/\partial k_{81}$ | $\partial L/\partial k_{91}$ | $\partial L/\partial k_{101}$ | $\partial L/\partial k_{111}$ | $\partial L/\partial k_{121}$ |
| $\partial L/\partial k_{12}$ | $\partial L/\partial k_{22}$ | $\partial L/\partial k_{32}$ | $\partial L/\partial k_{42}$ | $\partial L/\partial k_{52}$ | $\partial L/\partial k_{62}$ | $\partial L/\partial k_{72}$ | $\partial L/\partial k_{82}$ | $\partial L/\partial k_{92}$ | $\partial L/\partial k_{102}$ | $\partial L/\partial k_{112}$ | $\partial L/\partial k_{122}$ |
| $\partial L/\partial k_{13}$ | $\partial L/\partial k_{23}$ | $\partial L/\partial k_{33}$ | $\partial L/\partial k_{43}$ | $\partial L/\partial k_{53}$ | $\partial L/\partial k_{63}$ | $\partial L/\partial k_{73}$ | $\partial L/\partial k_{83}$ | $\partial L/\partial k_{93}$ | $\partial L/\partial k_{103}$ | $\partial L/\partial k_{113}$ | $\partial L/\partial k_{123}$ |
| $\partial L/\partial k_{14}$ | $\partial L/\partial k_{24}$ | $\partial L/\partial k_{34}$ | $\partial L/\partial k_{44}$ | $\partial L/\partial k_{54}$ | $\partial L/\partial k_{64}$ | $\partial L/\partial k_{74}$ | $\partial L/\partial k_{84}$ | $\partial L/\partial k_{94}$ | $\partial L/\partial k_{104}$ | $\partial L/\partial k_{114}$ | $\partial L/\partial k_{124}$ |

FIG.36

| COEFFICIENT CORRECTION VALUE | $k_{11}^1$ | $k_{21}^1$ | $k_{31}^1$ | $k_{41}^1$ | $k_{51}^1$ | $k_{61}^1$ | $k_{71}^1$ | $k_{81}^1$ | $k_{91}^1$ | $k_{101}^1$ | $k_{111}^1$ | $k_{121}^1$ |
| --- | --- | --- | --- | --- | --- | --- | --- | --- | --- | --- | --- | --- |
| | $k_{12}^1$ | $k_{22}^1$ | $k_{32}^1$ | $k_{42}^1$ | $k_{52}^1$ | $k_{62}^1$ | $k_{72}^1$ | $k_{82}^1$ | $k_{92}^1$ | $k_{102}^1$ | $k_{112}^1$ | $k_{122}^1$ |
| | $k_{13}^1$ | $k_{23}^1$ | $k_{33}^1$ | $k_{43}^1$ | $k_{53}^1$ | $k_{63}^1$ | $k_{73}^1$ | $k_{83}^1$ | $k_{93}^1$ | $k_{103}^1$ | $k_{113}^1$ | $k_{123}^1$ |
| | $k_{14}^1$ | $k_{24}^1$ | $k_{34}^1$ | $k_{44}^1$ | $k_{54}^1$ | $k_{64}^1$ | $k_{74}^1$ | $k_{84}^1$ | $k_{94}^1$ | $k_{104}^1$ | $k_{114}^1$ | $k_{124}^1$ |

FIG.37

| | 1 | 2 | 3 | 4 | 5 | 6 | 7 | 8 | 9 | 10 | 11 | 12 | YIELD |
| --- | --- | --- | --- | --- | --- | --- | --- | --- | --- | --- | --- | --- | --- |
| STATISTICS OF MEASUREMENT VALUES | $p_1'$ | $p_2'$ | $p_3'$ | $p_4'$ | $p_5'$ | $p_6'$ | $p_7'$ | $p_8'$ | $p_9'$ | $p_{10}'$ | $p_{11}'$ | $p_{12}'$ | $y'$ |
| ERROR STANDARD DEVIATION | $\sigma_1$ | $\sigma_2$ | $\sigma_3$ | $\sigma_4$ | $\sigma_5$ | $\sigma_6$ | $\sigma_7$ | $\sigma_8$ | $\sigma_9$ | $\sigma_{10}$ | $\sigma_{11}$ | $\sigma_{12}$ | $\sigma_y$ |
| STATISTICAL PARAMETER VALUE 0 | $p_1^0$ | $p_2^0$ | $p_3^0$ | $p_4^0$ | $p_5^0$ | $p_6^0$ | $p_7^0$ | $p_8^0$ | $p_9^0$ | $p_{10}^0$ | $p_{11}^0$ | $p_{12}^0$ | $y^0$ |
| STATISTICAL PARAMETER VALUE 1 | $p_1^1$ | $p_2^1$ | $p_3^1$ | $p_4^1$ | $p_5^1$ | $p_6^1$ | $p_7^1$ | $p_8^1$ | $p_9^1$ | $p_{10}^1$ | $p_{11}^1$ | $p_{12}^1$ | |

$P_1$ $T_1$ $V_1$

| | 1 | 2 | 3 | 4 | 5 | 6 | 7 | 8 | 9 | 10 | 11 | 12 | YIELD |
|---|---|---|---|---|---|---|---|---|---|---|---|---|---|
| STATISTICS OF MEASUREMENT VALUES | $p_1'$ | $p_2'$ | $p_3'$ | $p_4'$ | $p_5'$ | $p_6'$ | $p_7'$ | $p_8'$ | $p_9'$ | $p_{10}'$ | $p_{11}'$ | $p_{12}'$ | $y'$ |
| ERROR STANDARD DEVIATION | $\sigma_1$ | $\sigma_2$ | $\sigma_3$ | $\sigma_4$ | $\sigma_5$ | $\sigma_6$ | $\sigma_7$ | $\sigma_8$ | $\sigma_9$ | $\sigma_{10}$ | $\sigma_{11}$ | $\sigma_{12}$ | $\sigma_y$ |
| STATISTICAL PARAMETER VALUE 0 | $p_1^0$ | $p_2^0$ | $p_3^0$ | $p_4^0$ | $p_5^0$ | $p_6^0$ | $p_7^0$ | $p_8^0$ | $p_9^0$ | $p_{10}^0$ | $p_{11}^0$ | $p_{12}^0$ | $y^0$ |
| STATISTICAL PARAMETER VALUE 1 | $p_1^1$ | $p_2^1$ | $p_3^1$ | $p_4^1$ | $p_5^1$ | $p_6^1$ | $p_7^1$ | $p_8^1$ | $p_9^1$ | $p_{10}^1$ | $p_{11}^1$ | $p_{12}^1$ | $y^1$ |

SIMULATION PARAMETER CORRECTION TECHNIQUE

CROSS-REFERENCE TO RELATED APPLICATIONS

This application is based upon and claims the benefit of priority of the prior Japanese Patent Application No. 2010-125218, filed on May 31, 2010, the entire contents of which are incorporated herein by reference.

FIELD

This technique relates to a technique for correcting parameters or the like used in a simulation.

BACKGROUND

As illustrated in FIG. 1, it is frequently carried out that data representing a circuit to be simulated and device characteristic parameters are inputted to a simulator such as a Simulation Program with Integrated Circuit Emphasis (SPICE) to cause the simulator to simulate operations of the circuit, and from the simulator, the judgment results of the operations and/or circuit characteristic values for the inputted circuit and device characteristic parameters are obtained. Incidentally, for example, the judgment result of the operations is grasped as the yield. In addition, the circuit characteristic values obtained by the simulation may be called "performance".

Recently, because the microfabrication of the semiconductor advances, the influence of the variability of the device characteristic on the yield is increasing. Therefore, as schematically depicted in FIG. 2, a "variability-aware simulation" is carried out that data (also called "statistical parameters") concerning distribution of the device characteristic is inputted to the simulator to calculate the predicted yield value. In such a "variability-aware simulation", it is important how to match up the distribution of the device characteristic to the actual distribution, and the setting of the distribution of the device characteristic largely influences the accuracy of the yield calculation. However, there is a problem that the deviation between the predicted yield value outputted from the simulator and the yield measurement value is large.

Then, there is a case where the statistics of the measurement values are used as the distribution of the device characteristic to be inputted to the simulator. However, even if such data is used, the deviation between the predicted yield value and the yield measurement value is not cancelled due to some reasons, for example, there are conditions and/or characteristics, which are not measured, and/or the number of measurement samples is very small. Especially, as for the number of measurement samples, in case of a Static Random Access Memory (SRAM) having a capacity of 10M bits, in order to predict whether or not the yield is equal to or greater than 99%, the device characteristic has to be measured $10M*100=10^9$ times. This is not a realistic value.

Therefore, as schematically depicted in FIG. 3, there is a technique to search statistical parameter values of the device characteristics, which are input values to the variability-aware simulator, so as to match up the predicted yield value, which is an output of the variability-aware simulator, to the "yield measurement value". However, because the yield is determined as a result based on the huge number of circuit characteristic values, a lot of combinations of the statistical parameter values, which give the same yield, generally. Namely, because the search space is broad, it is realistically impossible to select an appropriate combination of the statistical parameter values. Therefore, as schematically depicted in FIG. 3, there are a lot of cases that a physically or empirically unsuitable value is obtained for the statistics of the measurement values of the device characteristics. Moreover, because the measurement errors influence, it is difficult for such a technique to obtain an appropriate statistical parameter values of the device characteristics.

SUMMARY

According to a first aspect of this technique, a parameter correction method includes: (A) obtaining, from a variability-aware simulation, a simulation result value of a predetermined product performance with respect to a reference candidate value set concerning statistics of predetermined product characteristics, and storing the obtained simulation result value into a data storage device; (B) calculating a likelihood by substituting the reference candidate value set, the obtained simulation result value, statistics of measurement values of the predetermined product characteristics and a measurement value of the predetermined product performance, which are stored in the data storage unit, into a likelihood function that is defined from a probability density function for the statistics of the predetermined product characteristics and a probability density function for the predetermined product performance, and is a function to calculate a combined likelihood of the statistics of the predetermined product characteristics and the predetermined product performance, and storing the calculated likelihood into the data storage unit; and (C) searching for a reference candidate value set in case where the calculated likelihood becomes maximum, by carrying out the obtaining and storing and the calculating and storing a plurality of times while changing the reference candidate value set.

According to a second aspect of this technique, a parameter correction method includes: (A) first calculating, for each of a plurality of manufacturing measurement condition sets stored in a data storage unit, each candidate value of each parameter among a plurality of parameters that are statistics of predetermined product characteristics, based each of relational expressions, each the relational expression representing a relationship between the corresponding manufacturing measurement condition set and one parameter of the plurality of parameters, and storing the candidate values of the plurality of parameters, which are calculated for the corresponding manufacturing measurement condition set, into the data storage unit; (B) obtaining, from a variability-aware simulation, a simulation result value of a predetermined product performance with respect to the candidate values of the plurality of parameters, which are stored in the data storage unit in association with each of the manufacturing measurement condition sets, and storing the simulation result values into the data storage unit; (C) second calculating a likelihood by substituting the candidate values of the plurality of parameters for the respective manufacturing measurement condition sets, the simulation result values of the respective manufacturing measurement condition sets, the statistics of measurement values of the predetermined product characteristics for the respective manufacturing measurement condition sets and measurement values of the predetermined product performance for the respective manufacturing measurement condition sets into a likelihood function that is defined by unifying, for the plurality of manufacturing measurement condition sets, respective probability density functions for the respective parameters and a probability density function for the predetermined product performance and is a function to calculate a combined likelihood of the respective parameters and the predetermined product performance for the plurality of manufacturing measurement condition sets, and storing the calculated likelihood into the data storage unit; and (D) searching for respective relational expressions for each of the manufacturing measurement condition sets in case where the likelihood becomes maximum by carrying out the first calculating and storing, the obtaining and storing and the second calculating and storing a plurality of times, while changing the respective relational expressions for each of the manufacturing measurement condition sets.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 7 is a diagram depicting an example of data stored in an input data storage unit;

FIG. 8 is a diagram depicting an example of data stored in a statistics data storage unit;

FIG. 9 is a diagram depicting an example of data stored in a search data storage unit;

FIG. 10 is a diagram depicting an example of data stored in the search data storage unit;

FIG. 13 is a diagram depicting an example of data outputted by a correction value generator;

FIG. 15 is a diagram depicting an example of data stored in the search data storage unit;

FIG. 16 is a diagram depicting an example of data stored in the search data storage unit;

FIG. 17 is a diagram depicting an example of data stored in the search data storage unit;

FIGS. 20A to 20D are diagrams depicting an effect in the first embodiment;

FIG. 23 is a diagram depicting an example of data stored in an input data storage unit;

FIG. 24 is a diagram depicting an example of data stored in the input data storage unit;

FIG. 25 is a diagram depicting an example of data stored in a statistics data storage unit;

FIG. 26 is a diagram depicting an example of data stored in a search data storage unit;

FIG. 27 is a diagram to explain calculation of statistical parameter values;

FIG. 28 is a diagram depicting an example of data stored in the search data storage unit;

FIG. 29 is a diagram depicting an example of data stored in the search data storage unit;

FIG. 33 is a diagram to explain calculation of the slope;

FIG. 35 is a diagram depicting an example of data stored in the search data storage unit;

FIG. 36 is a diagram depicting an example of data stored in the search data storage unit;

FIG. 37 is a diagram depicting an example of data stored in the search data storage unit;

FIG. 38 is a diagram depicting an example of data stored in the search data storage unit;

DESCRIPTION OF EMBODIMENTS

Embodiment 1

Figure 4:
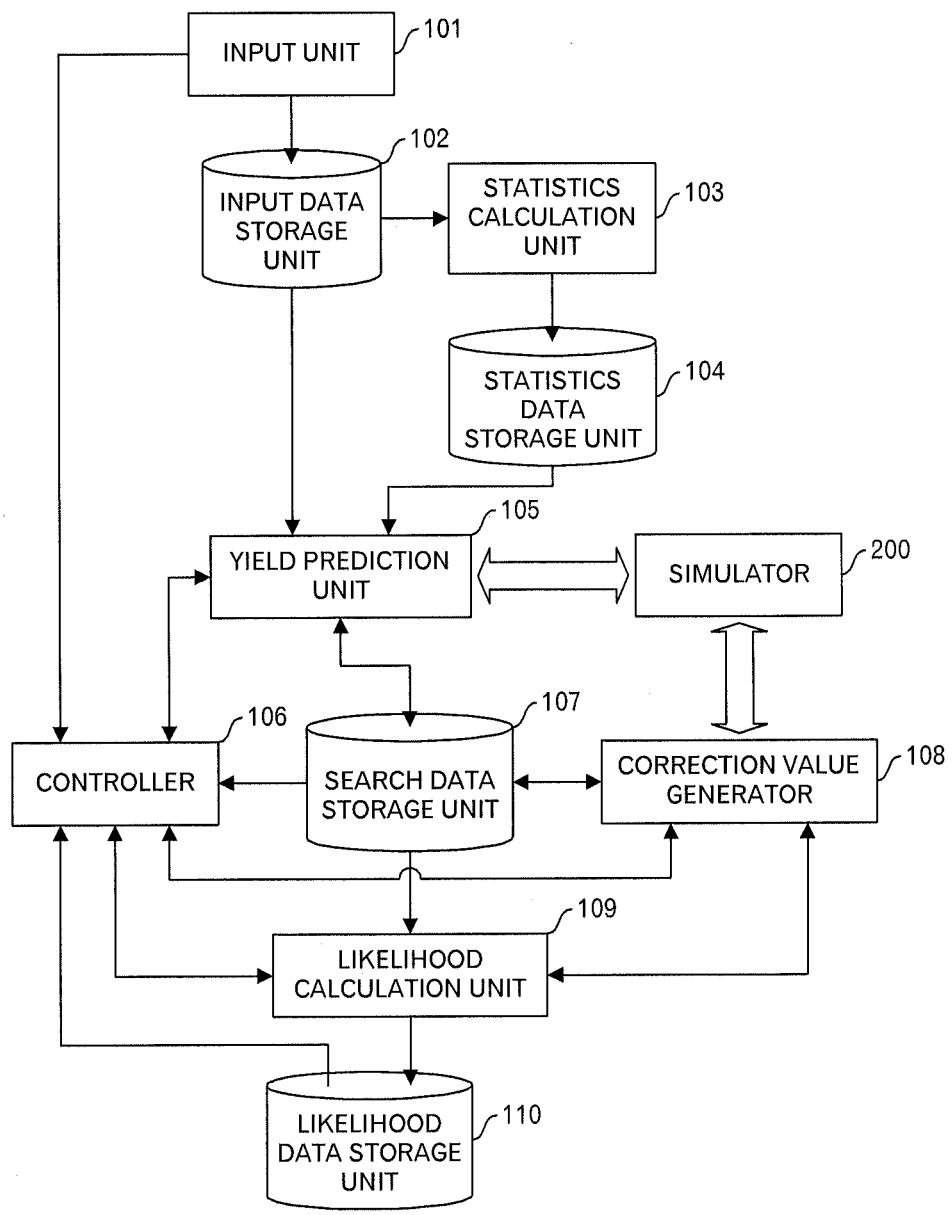
FIG. 4 is a functional block diagram of a parameter correction apparatus relating to a first embodiment.

FIG. 4 illustrates a functional block diagram of a parameter correction apparatus relating to this embodiment. The parameter correction apparatus relating to this embodiment has: (A) an input unit 101 that accepts inputs of data such as measurement results; (B) input data storage unit 102 storing data accepted by the input unit 101; (C) statistics calculation unit 103 that calculates predetermined statistics for the measurement values and the like, which are stored in the input data storage unit 102; (D) statistics data storage unit 104 storing the statistics calculated by the statistics calculation unit 103; (E) yield prediction unit 105 that carries out a processing using data stored in the input data storage unit 102 and statistics data storage unit 104; (F) search data storage unit 107 storing data generated or used by the yield prediction unit 105 and the like; (G) likelihood calculation unit 109 that carries out a processing using data stored in the search data storage unit 107; (H) likelihood data storage unit 110 storing data of the likelihood calculated by the likelihood calculation unit 109; (I) correction value generator 108 that generates correction values of data stored in the search data storage unit 107; and (J) controller 106 that carries out a processing for control for the yield prediction unit 105, correction value generator 108, likelihood calculation unit 109 and the like.

The yield prediction unit 105 and correction value generator 108 cooperate with a simulator 200 that carries out a variability-aware simulation, to carry out a processing described below. This simulator 200 is a well-known SPICE simulator, for example, and circuit data is also inputted. However, further explanation is omitted. In addition, the correction value generator 108 further cooperates with the likelihood calculation unit 109, to carry out a processing described below. The controller 106 controls the aforementioned units by using data stored in the likelihood data storage unit 110 and search data storage unit 107 in response to outputs from the input unit 101.

Next, a processing of the parameter correction apparatus will be explained by using FIGS. 5 to 20. Incidentally, the controller 106 controls the entire parameter correction apparatus so that the processing is carried out according to the processing flow described below. Therefore, hereinafter, explanation for the operation of the controller 106 is omitted except portions that the controller 106 judges some conditions.

Figures 5, 6:
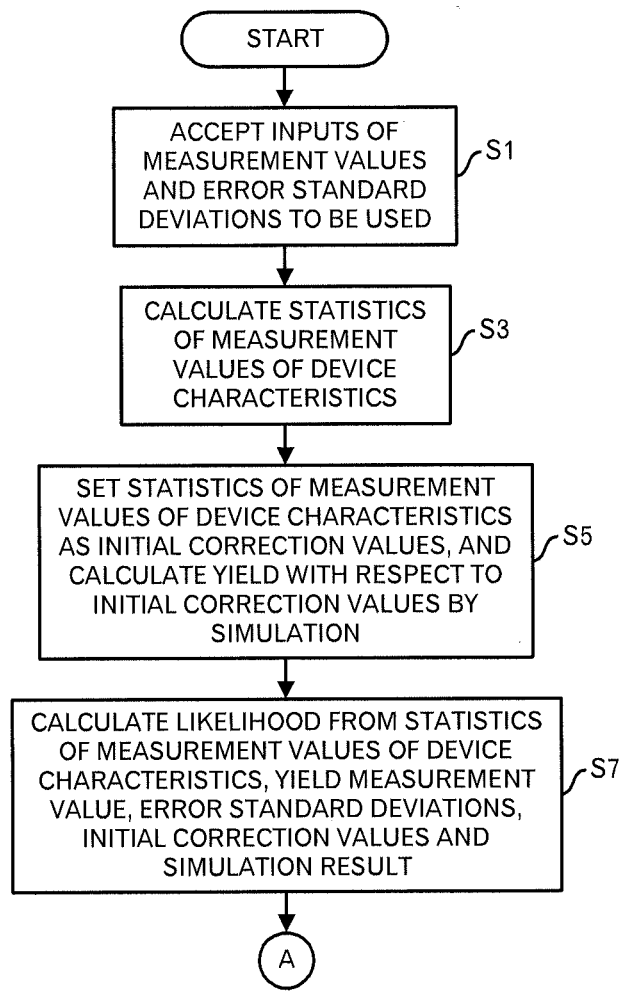
FIG. 5 is a diagram depicting a processing flow relating to the first embodiment.
FIG. 6 is a diagram depicting an example of measurement data of the device characteristics.

The user inputs measurement data $D_{ij}$ of the device characteristics, a measurement value y' of the yield, the standard deviation $\sigma_k$ of the errors for the statistics $p'_k$ of the measurement data $D_{ij}$ and the standard deviation $\sigma_y$ of the errors for the measurement values y' of the yield into the input unit 101, and the input unit 101 accepts and stores such data into the input data storage unit 102 (FIG. 5: step S1). Data depicted in FIGS. 6 and 7 is stored into the input data storage unit 102, for example.

FIG. 6 illustrates an example of the measurement data $D_{ij}$ of the device characteristics. In this embodiment, for example, the measurement data $D_{1j}$ ($1 \leq j \leq n$) of Vth for the load transistors included in SRAM, which is an example of the device, measurement data $D_{2j}$ of Ion for the load transistors, measurement data $D_{3j}$ of Vth for the driver transistors, measurement data $D_{4j}$ of Ion for the driver transistors, measurement data $D_{5j}$ of Vth for the transfer transistors and measurement data $D_{6j}$ of Ion for the transfer transistors are included.

FIG. 7 schematically depicts the measurement value y' of the yield, which is stored in the input data storage unit 102, standard deviation $\sigma_k$ of the errors for the statistics $p'_k$ ($1 \leq k \leq 12$) of the measurement data $D_{ij}$ and standard deviation $\sigma_y$ of the errors for the measurement values y' of the yield. As described below, because, in this embodiment, the average value $\mu(D_i)$ and standard deviation $\sigma(D_i)$ are used as the statistics, two statistics are calculated for each kinds of 6 kinds of measurement data. Therefore, the standard deviation $\sigma_k$ of the errors is inputted for each of 12 kinds of statistics. Then, these 12 kinds of statistics are called "statistical parameters", here.

Next, the statistics calculation unit 103 calculates average values $\mu(D_i)$ and standard deviations $\sigma(D_i)$ of the measurement data $D_{ij}$ of the device characteristics, which is stored in the input data storage unit 102, and stores the calculated data into the statistics data storage unit 104 (step S3). For example, data as depicted in FIG. 8 is stored into the statistics data storage unit 104. In this embodiment, $p'_1=\mu(D_1)$, $p'_2=\sigma(D_1)$, $p'_3=\mu(D_2)$, $p'_4=\sigma(D_2)$, $p'_5=\mu(D_3)$, $p'_6=\sigma(D_3)$, $p'_7=\mu(D_4)$, $p'_8=\sigma(D_4)$, $p'_9=\mu(D_5)$, $p'_{10}=\sigma(D_5)$, $p'_{11}=\mu(D_6)$ and $p'_{12}=\sigma(D_6)$ are stored. The measurement value of the yield is one value. Therefore, no statistic is calculated. Incidentally, the statistics may include a correlation coefficient between measurement values.

Then, the yield prediction unit 105 sets the statistics of the measurement values, which are stored in the statistics data storage unit 104, as initial correction values, causes the simulator 200 to carry out a simulation for the initial correction values, and obtains and stores the yield $y^0$ that is a simulation result into the search data storage unit 107 (step S5). First, the yield prediction unit 105 stores data as depicted in FIG. 9 into the search data storage unit 107, for example. The statistics of the measurement values are read out from the statistics data storage unit 104 and stored into the search data storage unit 107. Furthermore, the standard deviations of the errors are read out from the input data storage unit 102 and stored into the search data storage unit 107. Then, the statistics of the measurement values are set as the initial correction values. After that, when causing the simulator 200 to carry out the variability-aware simulation, the yield $y^0$ of the simulation result is obtained and stored into the search data storage unit 107 as depicted in FIG. 10.

After that, the likelihood calculation unit 109 calculates a combined likelihood of the statistical parameters and yield from the statistics of the measurement values of the device characteristics, the measurement value of the yield, error standard deviations for the statistics of the measurement, error standard deviation for the yield, initial correction values of the statistical parameters and yield value of the simulation result, and stores the calculated likelihood into the likelihood data storage unit 110 (step S7).

The likelihood $L(S, y_s(S))$ calculated here is defined as follows. Incidentally, $S=\{p_1, \ldots, p_n\}$ (n=12 in the aforementioned example), and $p_i$ is a true value of $p'_i$, and when an error is represented by "$e_i$", $p'_i = p_i + e_i$. Incidentally, the average value of $e_i$ is "0" and the standard deviation of $e_i$ is $\sigma_i$ described above. In addition, $y_s(S)$ represents the yield of the simulation result for S.

$$L(S, y_s(S)) = \left(\prod_{i=1}^{n} L(p_i)\right) L(y_s(S)) \quad (1)$$

$$= \left(\prod_{i=1}^{n} \frac{1}{\sqrt{2\pi\sigma_i}} e^{-\frac{(p'_i - p_i)^2}{2\sigma_i^2}}\right) \frac{1}{\sqrt{2\pi\sigma_y}} e^{-\frac{(y' - y_s(S))^2}{2\sigma_y^2}}$$

Incidentally, $L(p_i)$ is represented as follows:

$$L(p_i) = \frac{1}{\sqrt{2\pi\sigma_i}} e^{-\frac{(p'_i - p_i)^2}{2\sigma_i^2}}$$

In addition, as for the yield, the measurement value y' is also represented by a sum of the true yield y and an error $e_y$, and the average value of the error $e_y$ is "0", and the standard deviation of the error $e_y$ is $\sigma_y$ as described above. Then, the likelihood of the yield y is represented as follows:

$$L(y) = \frac{1}{\sqrt{2\pi\sigma_y}} e^{-\frac{(y' - y)^2}{2\sigma_y^2}}$$

At the step S7, the initial correction values are substituted into $p_i$, and the yield $y^0$ of the simulation result is substituted into $y_s(S)$. Moreover, other variables are described above.

Figure 11:
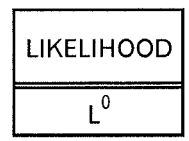
FIG. 11 is a diagram depicting an example of data stored in a likelihood data storage unit.

When the likelihood is calculated according to the expression (1), the first likelihood $L^0$ is stored in the likelihood data storage unit 110 as depicted in FIG. 11, for example.

Figure 12:
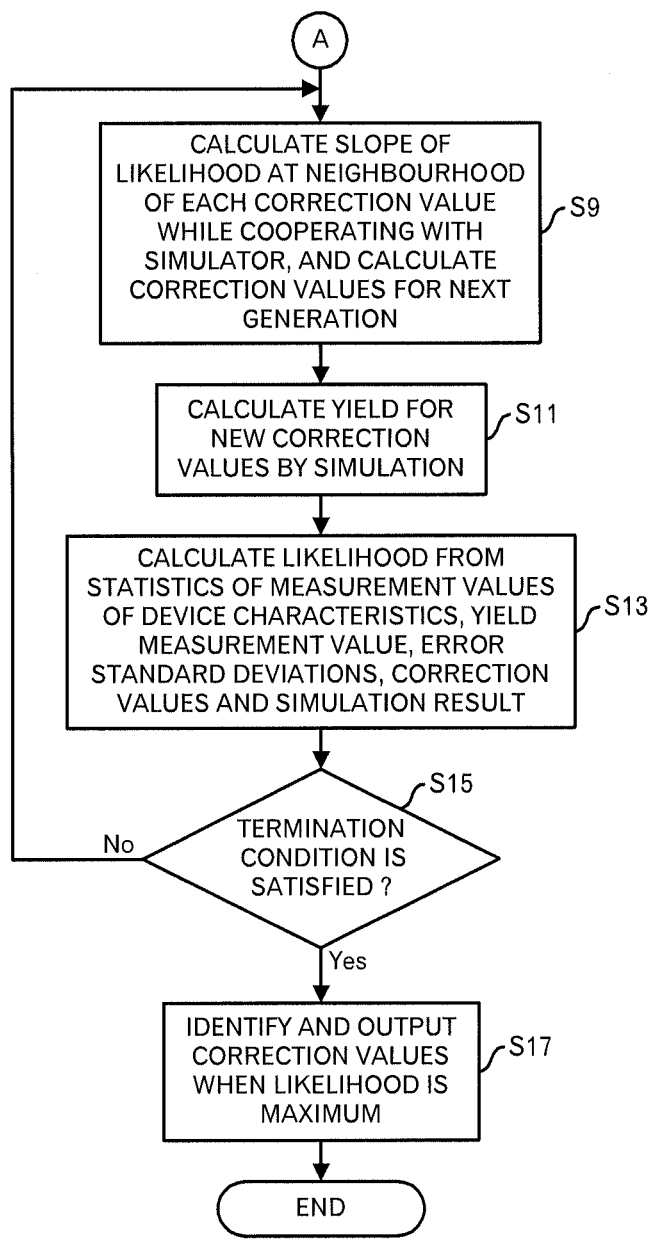
FIG. 12 is a diagram depicting a processing flow of the first embodiment.

Moving to a processing of FIG. 12 through a terminal A, the correction value generator 108 calculates a slope of the likelihood in the neighborhood of each correction value by cooperating with the simulator 200, calculates correction values for the next generation by using the slopes, and stores the calculated correction values into the search data storage unit 107 (step S9).

Figure 14:
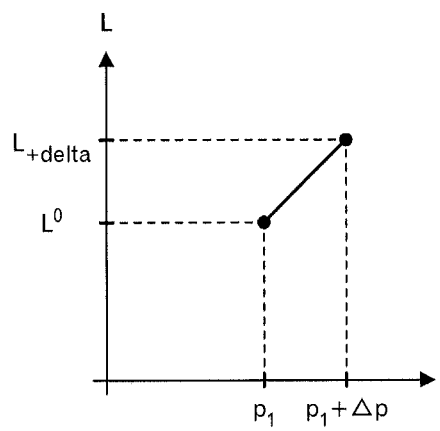
FIG. 14 is a diagram schematically depicting a slope.

For example, as depicted in FIG. 13, after +Δp is added to the statistical parameter value $p_1$ (initially, $p'_1$) for the previous generation and the values of the other parameters are fixed to values for the previous generation, the simulator 200 is caused to execute the variability-aware simulation, and the yield $y_{+delta}$ of the simulation result is obtained from the simulator 200. Then, the correction value generator 108 outputs data as depicted in FIG. 13 to the likelihood calculation unit 109, and the likelihood calculation unit 109 calculates the likelihood $L_{+delta}$ by substituting the data as depicted in FIG. 13, statistics of the measurement values of the device characteristics, measurement value of the yield and error standard deviations into the expression (1), and outputs the calculated likelihood $L_{+delta}$ to the correct ion value generator 108. Then, as schematically depicted in FIG. 14, the slope $\partial L/\partial p_1$ is calculated by $(L_{+delta} - L^0)/\Delta p$. Incidentally, the likelihood $L^0$ is used here, however, the likelihood for the previous generation is used, generally.

Such slopes are calculated for all of the statistical parameters and stored into the search data storage unit 107 as depicted in FIG. 15, for example.

After that, the correction values $p_i^x$ for the next generation x are calculated as follows:

$$p_i^x = p_i^{x-1} + (\partial L/\partial p_i)*\Delta s$$

Incidentally, Δs is a predetermined constant. In addition, (x−1) represents a generation immediately before the next generation x.

Then, data as depicted in FIG. 16 is stored in the search data storage unit 107, for example. Thus, as x=1, the correction values 1 for the next generation are added to a table in the search data storage unit 107.

Next, the yield prediction unit 105 causes the simulator 200 to carry out the simulation for the new correction values, obtains the yield $y^x$ of the simulation result from the simulator 200, and stores the obtained yield into the search data storage unit 107 (step S11). At this stage, as depicted in FIG. 17, the yield $y^1$ for the correction values 1 is stored.

Figure 18:
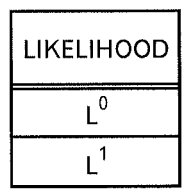
FIG. 18 is a diagram depicting an example of data stored in the likelihood data storage unit.

Then, the likelihood calculation unit 109 calculates the combined likelihood of the statistics of the device characteristics and the yield from the statistics of the measurement values of the device characteristics, yield measurement value, error standard deviations of the statistics of the measurement values and yield, correction values calculated at the step S9 and yield value of the simulation result, and stores the calculated likelihood into the likelihood data storage unit 110 (step S13). The likelihood is calculated according to the expression (1). Then, the likelihood $L^1$ calculated this time is stored into the likelihood data storage unit 110 as depicted in FIG. 18.

Then, the controller 106 judges whether or not a termination condition for the iteration is satisfied (step S15). For example, it is determined whether or not a predetermined termination condition is satisfied such as a case where the processing is carried out the predetermined number of iterations, case where the likelihood stored in the likelihood data storage unit 110 becomes equal to or greater than a predetermined value, case where the likelihood, which was increasing up to the previous iteration, decreased in this iteration, or the like.

When it is determined that the termination condition is not satisfied, the processing returns to the step S9. On the other hand, when the termination condition is satisfied, the controller 106 reads out the correction values used when the likelihood stored in the likelihood data storage unit 110 is maximum, and outputs the correction values (step S17).

Figure 1:
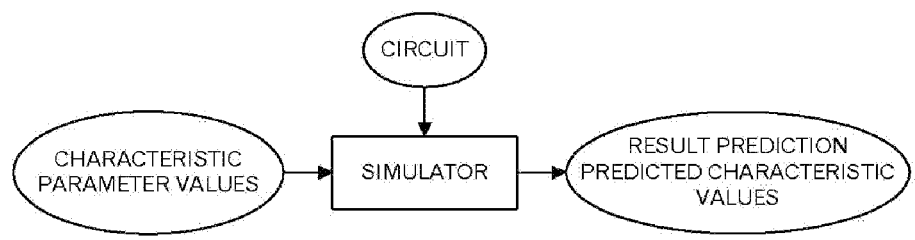
FIG. 1 is a diagram to explain a conventional simulation.
Figure 2:
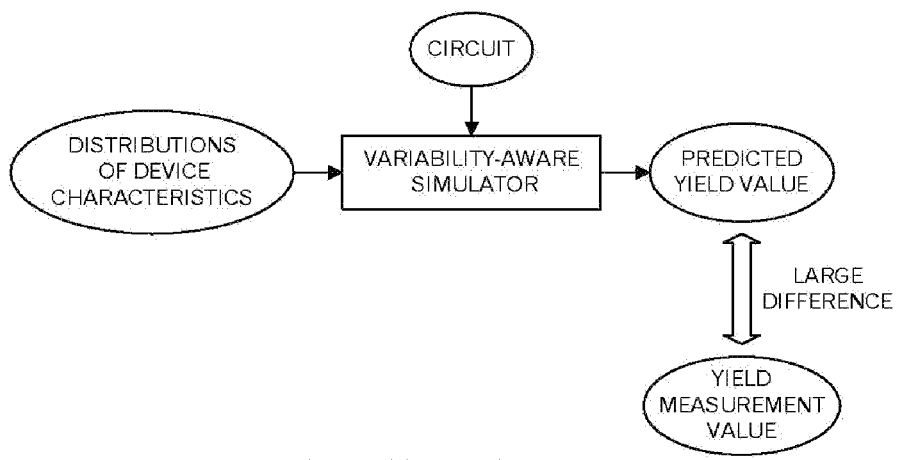
FIG. 2 is a diagram to explain a variability-aware simulation.
Figure 3:
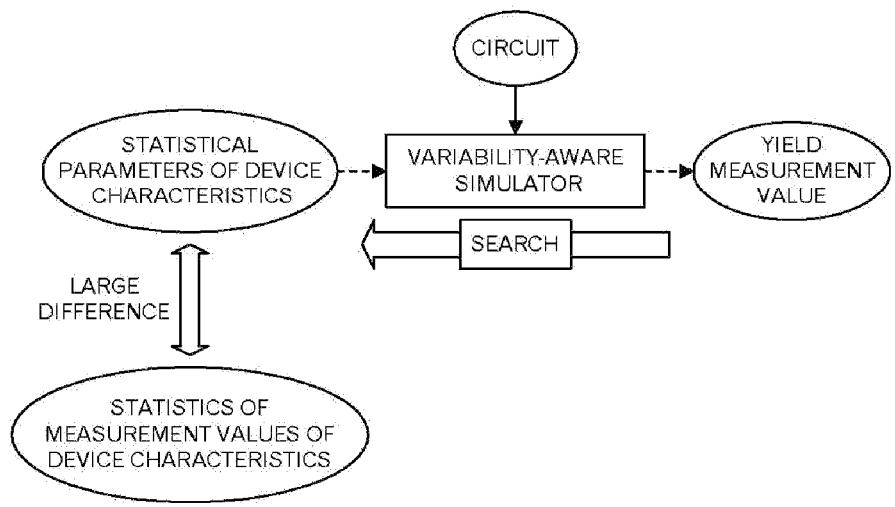
FIG. 3 is a diagram to explain a problem of a conventional art.
Figure 19:
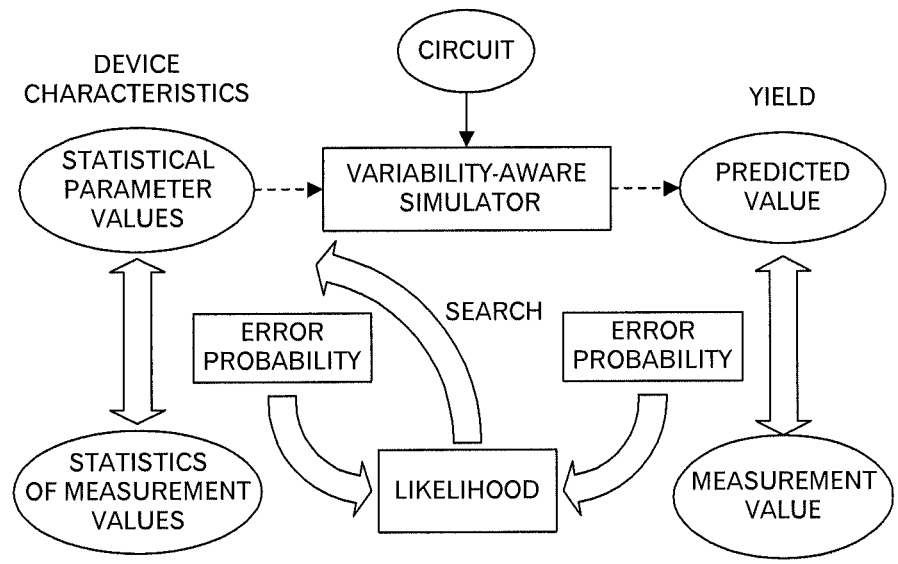
FIG. 19 is a diagram schematically depicting a processing in the first embodiment.

As depicted in FIG. 19, this embodiment is different from the conventional art schematically depicted in FIG. 3. Namely, from the occurrence probability (=likelihood of the statistical parameter values) of the error between the statistics of the measurement values of the device characteristics and the statistical parameter values to be inputted to the simulator 200 and the occurrence probability (=likelihood of the yield) of the error between the measurement value of the yield and the predicted value of the yield, which is an output from the simulator, the entire likelihood is calculated, and the statistical parameter values are searched so as to maximize the likelihood.

This will be further explained by using FIGS. 20A to 20D. The horizontal axis in FIGS. 20A to 20D represents the statistical parameter values or yield. In addition, the vertical axis represents the probability density. As depicted in FIGS. 20A to 20C, when watching only the statistical parameters $p_1$ to $p_n$, the likelihood (=a*c*e) becomes the greatest when the statistics (central values of the graphs) of the measurement values of the device characteristics are adopted as the statistical parameter values. However, when the predicted value of the simulation result is apart from the measurement value (central value in FIG. 20D) of the yield and the yield value at the probability density h is obtained, the entire likelihood becomes small, because the probability h is multiplied.

However, in this embodiment, the aforementioned processing is carried out to adjust the statistical parameter values so that the entire likelihood becomes maximum while balancing the probability densities of the statistical parameters and the probability density of the yield. In the example of FIGS. 20A to 20D, when a value corresponding to the probability density b is adopted after the value of the statistical parameter $p_1$ is increased just a little, a value corresponding to the probability density d is adopted after the value of the statistical parameter $p_2$ is decreased and a value corresponding to the probability density f is adopted after the value of the statistical parameter $p_n$ is increased just a little, the yield value of the probability density g is obtained by the simulation, and the entire likelihood (=b*d*f*g) becomes maximum.

Although an example with respect to the circuit was described, this embodiment can be applied to any other product fields in which the variability-aware simulation is carried out. In addition, this embodiment can be applied to not only the yield but also other product performance which can be obtained by the simulation.

Embodiment 2

In the first embodiment, the aforementioned processing is carried out for each manufacturing measurement condition. This embodiment shows an example that the statistical parameter values or relational expressions for calculating the statistical parameter values are identified in a form that plural manufacturing measurement conditions are unified.

Figure 21:
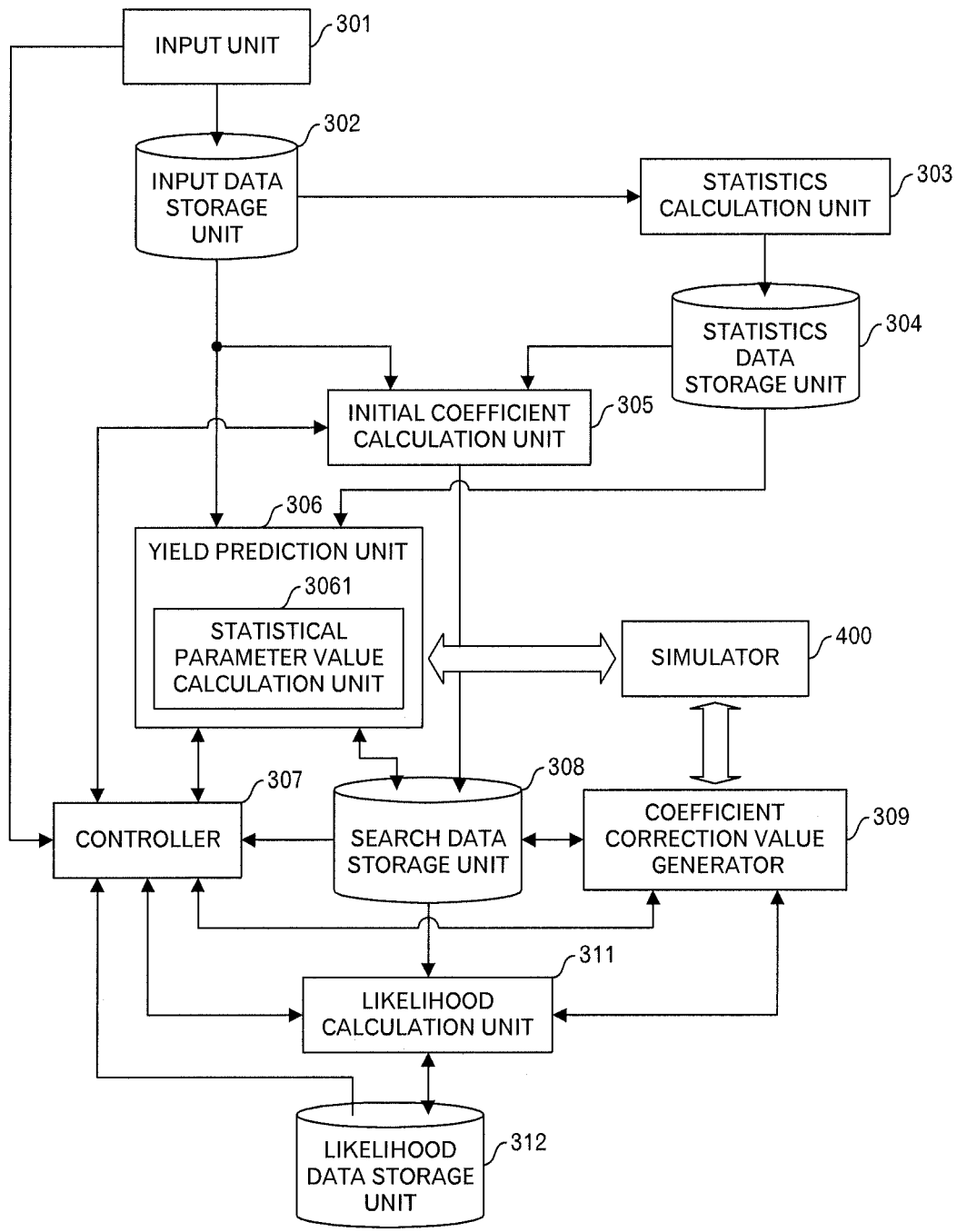
FIG. 21 is a functional block diagram of a parameter correction apparatus relating to a second embodiment.

FIG. 21 illustrates a functional block diagram of a parameter correction apparatus relating to a second embodiment. The parameter correction apparatus relating to the second embodiment has: (A) an input unit 301 that accepts inputs of input data from a user; (B) input data storage unit 302 storing input data accepted by the input unit 301; (C) statistics calculation unit 303 that calculates statistics for data stored in the input data storage unit 302; (D) statistics data storage unit 304 storing data generated by the statistics calculation unit 303; (E) initial coefficient calculation unit 305 that calculates initial coefficients by using data stored in the input data storage unit 302 and statistics data storage unit 304; (F) search data storage unit 308 storing processing results of the initial coefficient calculation unit 305 and the like; (G) yield prediction unit 306 that causes a simulator 400 to carry out a processing by using data stored in the input data storage unit 302, statistics data storage unit 304 and search data storage unit 308, and obtains the simulation results; (H) coefficient correction value generator 309 that carries out a processing by using data stored in the search data storage unit 308; (I) likelihood calculation unit 311 that calculates a likelihood by using data stored in the search data storage unit 308; (J) likelihood data storage unit 312 storing data of the likelihood calculated by the likelihood calculation unit 311; and (K) controller 307 that controls the initial coefficient calculation unit 305, yield prediction unit 306, coefficient correction generator 309 and likelihood calculation unit 311 by using data stored in the search data storage unit 308 and likelihood data storage unit 312 in response to outputs from the input unit 301.

The coefficient correction value generator 309 cooperates with the simulator 400 and likelihood calculation unit 311 and stores the processing results into the search data storage unit 308. In addition, the yield prediction unit 306 includes a statistical parameter value calculation unit 3061. In addition, the simulator 400 is the same as the simulator 200 in the first embodiment.

Next, a processing of the parameter correction apparatus relating to this embodiment will be explained by using FIGS. 22 to 41.

Incidentally, the controller 307 controls the entire parameter correction apparatus so that the processing is carried out according to the processing flow described below. Therefore, the explanation for the operation of the controller 307 is eliminated except portions that the controller 307 judges something.

Figure 22:
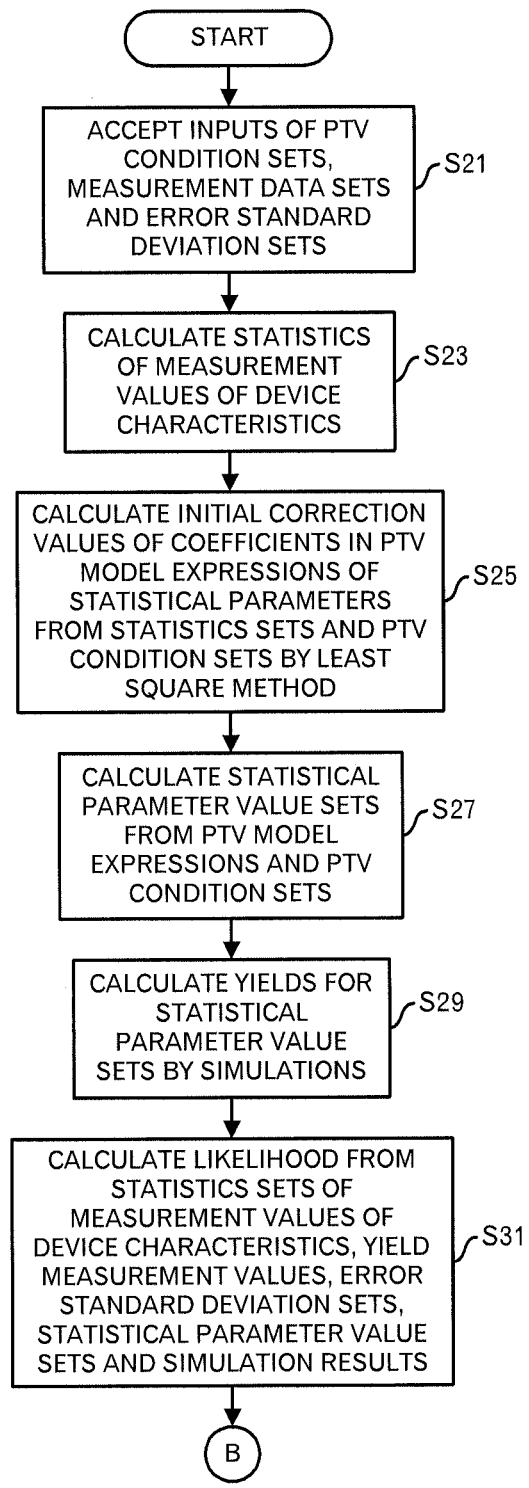
FIG. 22 is a diagram depicting a processing flow relating to the second embodiment.

The user inputs PTV condition sets $C_j$ (=$(P_j, T_j, V_j)$), measurement data sets $D(C_j)$ of the device characteristics with respect to the respective PTV condition sets $C_j$, measurement value sets y' ($C_j$) of the yield with respect to the respective PTV condition sets $C_j$, error standard deviation sets $\sigma_k(C_j)$ for the statistics $p'_k(C_j)$ of the measurement data $D(C_j)$ with respect to the respective PTV condition sets $C_j$ and error standard deviation sets $\sigma_y(C_j)$ of the measurement value sets y'($C_j$) of the yield with respect to the respective PTV condition sets $C_j$ into the input unit 301, and the input unit 301 accepts inputs of such data, and stores such data into the input data storage unit 302 (FIG. 22: step S21). Incidentally, $P_j$ represents an average threshold value voltage in one wafer that is a unit of manufacturing, for example. $T_j$ represents temperature, for example. $V_j$ represents an applied voltage, for example.

For example, data as depicted in FIGS. 23 and 24 is stored in the input data storage unit 302.

FIG. 23 illustrates an example of the measurement data $D(C_j)$ of the device characteristics. One PTV condition set is the same as that explained in the first embodiment by using FIG. 6. However, in this embodiment, because the measurement data for plural PTV condition sets are inputted, plural sheets for the measurement data are schematically depicted in FIG. 23.

FIG. 24 schematically depicts the measurement value sets y'($C_j$) of the yield with respect to the respective PTV condition sets $C_j$, error standard deviation sets $\sigma_t(C_j)$ of the statistics $p'_k(C_j)$ of the measurement data $D(C_j)$ with respect to the respective PTV condition sets $C_j$, error standard deviation sets $\sigma_y(C_j)$ of the measurement value sets y'($C_j$) of the yield with respect to the respective PTV condition sets $C_j$, and the respective PTV condition sets $C_j$ (=$(P_j, T_j, V_j)$). Thus, plural sheets of input data schematically represent that one data set is inputted for each PTV condition set.

Next, the statistics calculation unit 303 calculates, for each of the PTV condition sets, average values $\mu_j(D_i)$ and standard deviations $\sigma_j(D_i)$ of the measurement data $D(C_j)$ of the device characteristics, which is stored in the input data storage unit 302, and stores the calculated data into the statistics data storage unit 304 (step S23).

For example, data as depicted in FIG. 25 is stored in the statistics data storage unit 304. In an example of FIG. 25, data for one PTV condition set is the same as the data explained in the first embodiment by using FIG. 8. $p'_1(C_j)=\mu_j(D_1)$, $p'_2(C_j)=\sigma_j(D_1)$, $p'_3(C_j)=\mu_j(D_2)$, $p'_4(C_j)=\sigma_j(D_2)$, $p'_5(C_j)=\mu_j(D_3)$, $p'_6(C_j)=\sigma_j(D_3)$, $p'_7(C_j)=\mu_j(D_4)$, $p'_8(C_j)=\sigma_j(D_4)$, $p'_9(C_j)=\mu_j(D_5)$, $p'_{10}(C_j)=\sigma_j(D_5)$, $p'_{11}(C_j)=\mu_j(D_6)$, and $p'_{12}(C_j)=\sigma_j(D_6)$ are stored. As for the yield measurement value, because there is only one value for one PTV condition set, the statistic is not calculated. Incidentally, such 12 kinds of statistics are called statistical parameters. In addition, the statistics may include the correlation coefficients between measurement data.

Then, the initial coefficient calculation unit 305 calculates initial correction values of coefficients included in PTV model expressions of the statistical parameters by the least square method based on the statistics sets of the measurement values of the device characteristics, which are calculated at the step S23, and the PTV condition sets stored in the input data storage unit 302, and stores the calculated values into the search data storage unit 308 (step S25).

The PTV model expression of the statistical parameters are defined as follows:

$$p_i(P,T,V)=f_i(P,T,V)=k_{i1}*P+k_{i2}*T+k_{i3}*V+k_{i4} \quad (2)$$

As also depicted in FIG. 25, plural statistics $p'_1(C_j)$ of the measurement values are calculated, for example. In addition, because the plural PTV condition sets $C_j$ exist, plural combinations of input and outputs for $p'_1=f_1(P, T, V)$. Thus, by the least square method, the initial coefficients $k_{11}^0$, $k_{12}^0$ and $k_{13}^0$ can be calculated. $p'_2(C_j)$ and subsequent statistics are similarly processed. The least square method is a well-known method. Therefore, further explanation is omitted. In addition, the initial coefficient correction value sets may be calculated by other methods.

By carrying out such a processing, the initial coefficient value sets as depicted in FIG. 26 is stored in the search data storage unit 308. In an example of FIG. 26, in the vertical direction, a coefficient value set is arranged for one statistical parameter. Then, total 12 kinds of coefficient value sets are generated and stored. In this embodiment, for all of the PTV condition sets, one set of coefficient values is generated. Namely, the characteristics of all of the PTV condition sets are summarized into the coefficient value sets.

Next, the statistical parameter value calculation unit 3061 of the yield prediction unit 306 calculates the statistical parameter values for each PTV condition set, from the initial coefficient correction values and PTV model expressions and PTV condition sets, and stores the calculated data into the search data storage unit 308 (step S27).

First, the statistical parameter value calculation unit 3061 stores data as depicted in FIG. 27 into the search data storage unit 308, for example. The statistics sets of the measurement values are read out from the statistics data storage unit 304 and stored into the search data storage unit 308. Furthermore, the error standard deviation sets and PTV condition sets are read out from the input data storage unit 302 and stored into the search data storage unit 308.

Then, for each of the PTV condition sets and for each of the statistical parameters, when the initial coefficient values and PTV condition set as depicted in FIG. 26 are substituted into a right side of the expression (2), the statistical parameter value is calculated. Specifically, the statistical parameter $p_1^0$ for $C_1=\{P_1, T_1, V_1\}$ is calculated as follows. Incidentally, the number attached to the upper portion of the symbol represents the generation.

$$p_1^0 = k_{11}^0 * P_1 + k_{12}^0 * T_1 + k_{13}^0 * V_1 + k_{14}^0$$

Thus, when also calculating other statistical parameters, the calculated statistical parameter values are stored into the search data storage unit 308 as depicted in FIG. 28, for example.

After that, the yield prediction unit 306 causes the simulator 400 to carry out, for each PTV condition set, a simulation with respect to the statistical parameter value sets calculated at step S27, obtains the yield $y^0$ of the simulation result, and stores the simulation result into the search data storage unit 308 (step S29). When causing the simulator 400 to carry out the variability aware simulation, the yield prediction value $y^0$ is obtained for each PTV condition set as the simulation result, and is stored into the search data storage unit 308, as depicted in FIG. 29.

Then, the likelihood calculation unit 311 calculates a combined likelihood of the statistical parameter value sets and yields for all PTV condition sets from the statistics sets of the measurement values of the device characteristics, yield measurement values, error standard deviation sets (for the statistics of the measurement values of the device characteristic and for the yield), the statistical parameter value sets calculated at the step S27, predicted yield values calculated at the step S27 and the yield prediction values of the simulation results, and stores the calculated likelihood into the likelihood data storage unit 312 (step S31).

The likelihood calculated here is calculated by multiplying the likelihoods $L(S, y_s(S))$ in the first embodiment for all of the PTV condition sets. However, S is expanded to $S(C_j)$, and $y_s(S)$ is also expanded to $y_s(S(C_j))$. Therefore, the likelihood of $p_i(C_j)$ is represented as follows:

$$L(p_i(C_j)) = N(p_i(C_j), \sigma_{ij}) = \frac{1}{\sqrt{2\pi\sigma_{ij}}} e^{-\frac{(p_i'(C_j)-p_i(C_j))^2}{2\sigma_{ij}^2}}$$

Incidentally, $\sigma_{ij}$ represents the error standard deviation of $p_i'(C_j)$. In addition, as described above, $p_i(C_j)$ can be disassembled by the expression (2), however, because it is calculated at the step S27, the disassembling does not have any meaning.

Furthermore, the likelihood of the yield $y(C_j)$ is represented as follows:

$$L(y(C_j)) = \frac{1}{\sqrt{2\pi\sigma_{yj}}} e^{-\frac{(y'(C_j)-y(C_j))^2}{2\sigma_{yj}^2}}$$

Incidentally, $\sigma_{yj}$ represents the error probability distribution of $y'(C_j)$.

Therefore, the entire likelihood in the second embodiment is represented as follows:

$$\prod_{j=1}^{m} L(S(C_j), y_s(C_j)) = \tag{3}$$

$$\prod_{j=1}^{m} \left\{ \prod_{i=1}^{n} \frac{1}{\sqrt{2\pi\sigma_{ij}}} e^{-\frac{(p_i'(C_j)-p_i(C_j))^2}{2\sigma_{ij}^2}} \right\} \frac{1}{\sqrt{2\pi\sigma_{yj}}} e^{-\frac{(y'(C_j)-y_s(s(C_j)))^2}{2\sigma_{yj}^2}}$$

Figure 30:
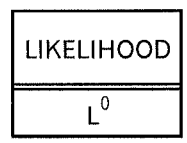
FIG. 30 is a diagram depicting an example of data stored in a likelihood data storage unit.

The likelihood $L^0$ calculated according to the expression (3) is stored in the likelihood data storage unit 312 as depicted in FIG. 30.

Figure 31:
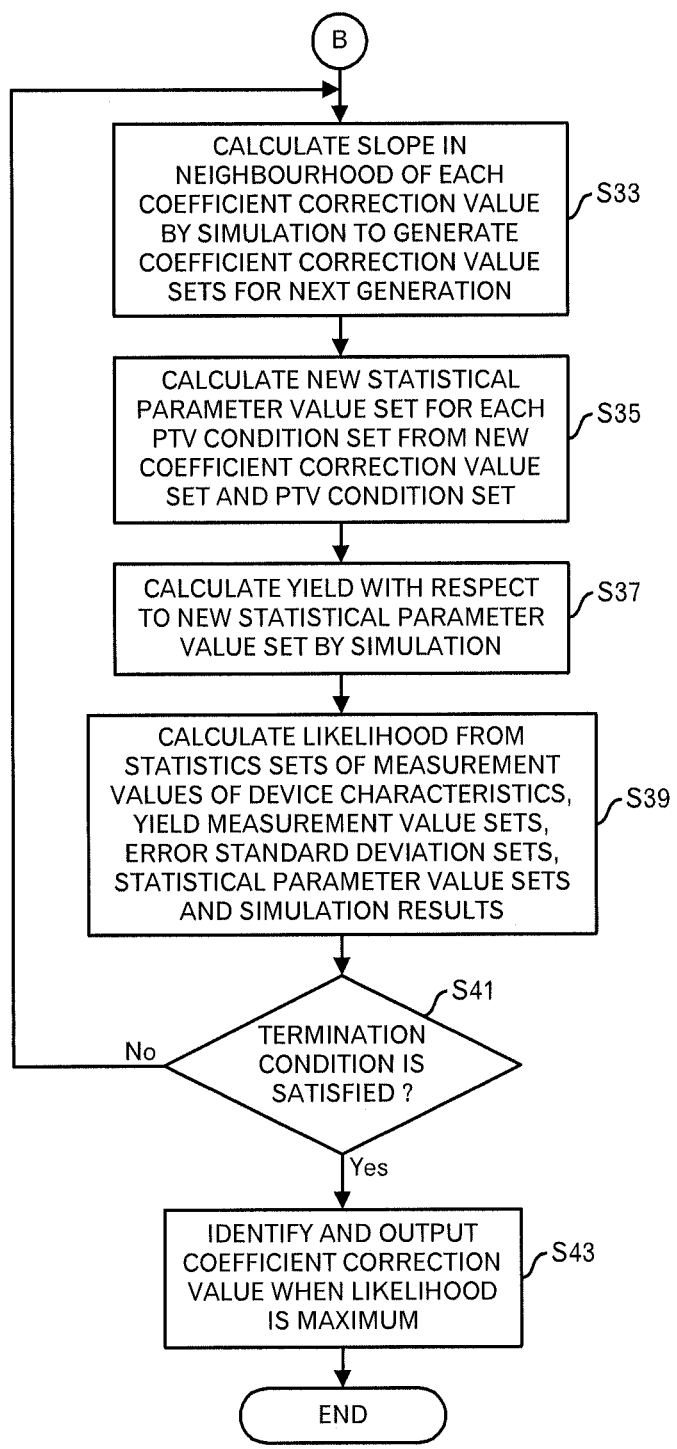
FIG. 31 is a diagram depicting a processing flow relating to the second embodiment.

Moving to a processing of FIG. 31 through a terminal B, the coefficient correction value generator 309 cooperates with the simulator 400 to calculate the slope of the likelihood in the neighborhood of each coefficient correction value, calculates the coefficient correction values for the next generation, and stores the calculated values into the search data storage unit 308 (step S33).

At this step, the processing carried out for each statistical parameter in the first embodiment is carried out for each coefficient correction value.

Figure 32:
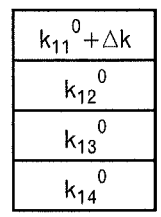
FIG. 32 is a diagram to explain calculation of the slope.
Figure 34:
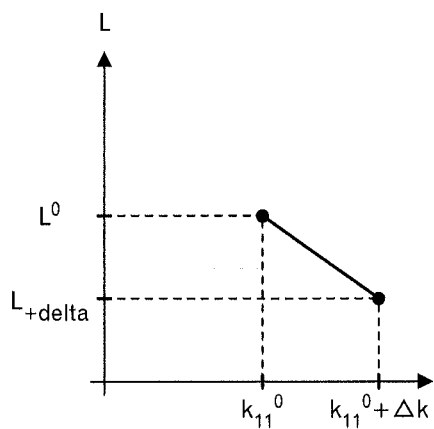
FIG. 34 is a schematic diagram to explain calculation of the slope.

For example, as depicted in FIG. 32, $+\Delta k$ is added to the coefficient correction value $k_{11}^0$ for the previous generation, and the other coefficient correction values are fixed to values for the previous generation. Then, as depicted in FIG. 33, the statistical parameter value $p_{1+}^0$ is calculated for each PTV condition set. Other statistical parameter values $p_i^0$ are used as they are. Then, the variability-aware simulation is carried out by the simulator 400 to obtain the yield $y_{+delta}^0$ of the simulation result. Then, the coefficient correction value generator 309 outputs the statistical parameter value sets (FIG. 33) for all of the PTV condition sets to the likelihood calculation unit 311, and the likelihood calculation unit 311 calculates the likelihood $L_{+delta}$ by substituting the accepted values into the expression (3), and outputs the calculated likelihood to the coefficient value generator 309. Then, as schematically depicted in FIG. 34, the slope $\partial L/\partial k_{11}$ can be calculated by $(L_{+delta}-L^0)/\Delta k$. Incidentally, the likelihood $L^0$ is used here. However, generally, the likelihood for the previous generation is used.

Thus, the slope is calculated for all of the coefficient correction values and is stored into the search data storage unit 308, for example, as depicted in FIG. 35.

After that, the coefficient correction values $k_{ih}^x$ for the next generation x are calculated as follows: h is an integer from 1 to 4.

$$k_{ih}^x = k_{ih}^{x-1} + (\partial L/\partial k_{ih}) * \Delta s$$

Incidentally, $\Delta s$ is a predetermined constant. (x−1) represents the generation immediately before the next generation x.

Then, the coefficient correction value sets as depicted in FIG. 36 is stored in the search data storage unit 308, for example. Thus, as x=1, the correction values 1 for the next generation are additionally stored into the search data storage unit 308.

After that, the statistical parameter value calculation unit 3061 of the yield prediction unit 306 calculates new parameter value sets for each PTV condition set according to the expression (2) from the coefficient correction value sets for the next generation and PTV condition sets, and stores the calculated values into the search data storage unit 308 (step S35). Although the used coefficient correction value sets are different, the similar processing to the step S27 is carried out.

When carrying out this step, data in the line of the statistical parameter value 1 as depicted in FIG. 37 is stored into the search data storage unit 308.

Then, the yield prediction unit 306 causes the simulator 400 to carry out the simulation for the statistical parameter value sets calculated at the step S35, obtains the yield $y^1$ of the simulation result, and stores the yield $y^1$ into the search data storage unit 308 (step S37). When causing the simulator 400 to carry out the variability-aware simulation, the yield prediction value $y^1$ is obtained as the simulation result and stored into the search data storage unit 308 as depicted in FIG. 38.

Figure 39:
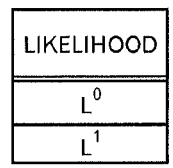
FIG. 39 is a diagram depicting an example of data stored in a likelihood data storage unit.

Furthermore, the likelihood calculation unit 311 calculates a combined likelihood of the statistical parameter value sets and yields for all of the PTV condition sets from the statistic sets of the measurement values of the device characteristics, yield measurement values, error standard deviation sets (for the statistics of the measurement values of the device characteristics and for the yield), the statistical parameter value sets calculated at the step S35 and the yield predicted values of the simulation results, and stores the calculated likelihood into the likelihood data storage unit 312 (step S39). At this step, the likelihood is calculated according to the expression (3). For example, data as depicted in FIG. 39 is stored into the likelihood storage unit 312.

Then, the controller 307 judges whether or not a termination condition of the iteration is satisfied (step S41). For example, it is judged whether or not a predetermined termination condition is satisfied such as a case where the iteration processing is carried out the predetermined number of times, a case where the likelihood stored in the likelihood data storage unit 312 is equal to or greater than a predetermined value, a case where the likelihood, which was increasing up to this iteration, firstly decreased, or the like.

When the termination is not satisfied, the processing returns to the step S33. On the other hand, when the termination condition is satisfied, the controller 307 reads out and outputs the coefficient correction value set used when the likelihood became maximum from the search data storage unit 308 (step S43). Incidentally, the corresponding statistical parameter value set may be outputted.

Figure 40:
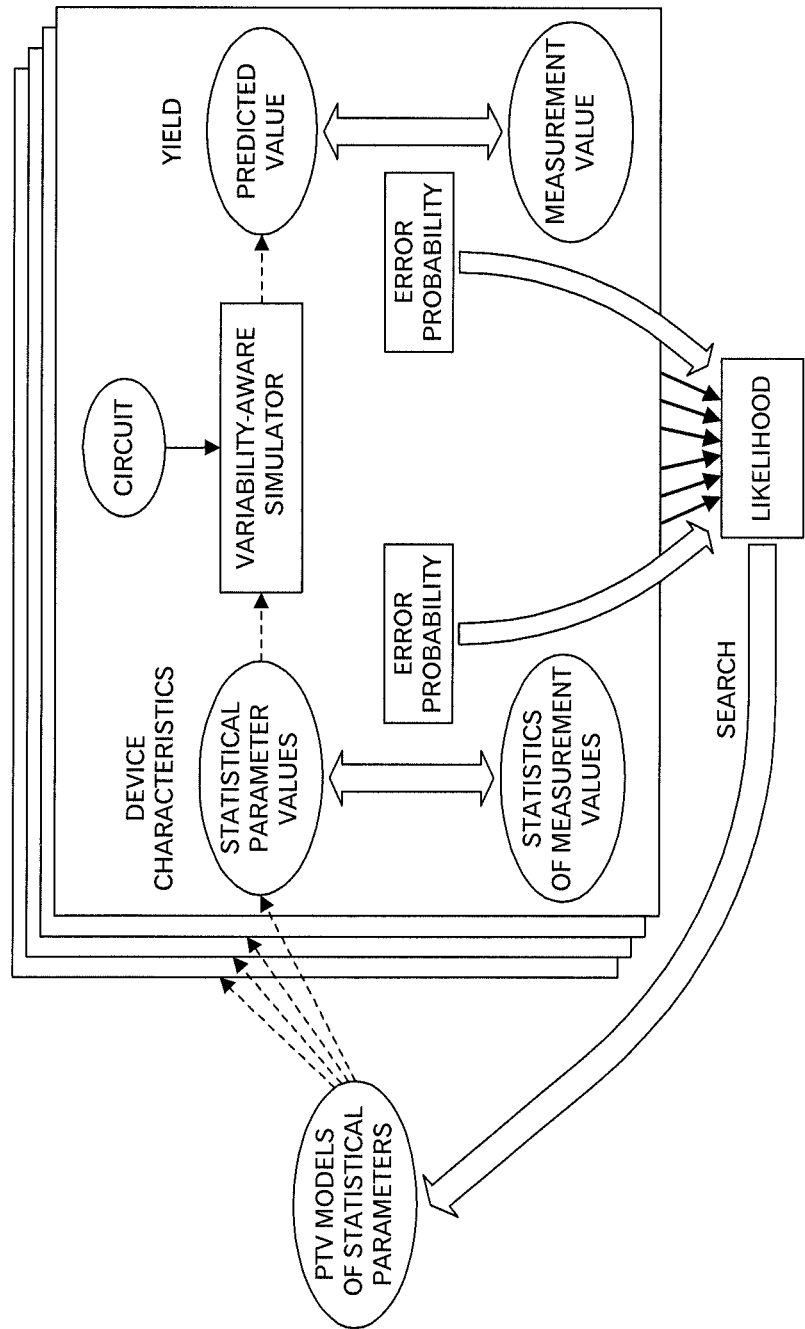
FIG. 40 is a diagram schematically depicting a processing in the second embodiment.

As depicted in FIG. 40, this embodiment is different from the first embodiment, and the likelihood for all of the PTV condition sets, not for one PTV condition, is calculated. The PTV model expressions of the statistical parameters, which make this likelihood maximum, more specifically, the coefficient value sets are searched. Incidentally, because the statistical parameter value set for each PTV condition set is generated from such coefficient value sets, the yield prediction value for which the likelihood is maximum can be obtained when using the statistical parameter value set for each PTV condition set.

Although an example concerning the circuit was explained, this embodiment can be applied to fields of other products for which the variability-aware simulation is carried out. In addition, this embodiment can be applied to not only the yield but also other product performances which can be obtained from the simulation.

Although the embodiments of this technique were explained above, this technique is not limited to those. For example, the functional block diagrams of the parameter correction apparatuses do not always correspond to actual program module configurations. The data formats of the data storage units do not always correspond to actual file configurations.

Furthermore, as for the processing flow, as long as the processing results do not change, the order of the steps may be exchanged or the steps may be executed in parallel.

In addition, the search of the maximum likelihood can be implemented by various algorithms. Therefore, the processing flow illustrated in the processing flow may be changed.

Moreover, the simulators 200 and 400 may be included in the parameter correction apparatus, or may be included in another apparatus connected to the parameter correction apparatus. In the latter, a request is outputted to another apparatus every time when the simulation is required.

Figure 41:
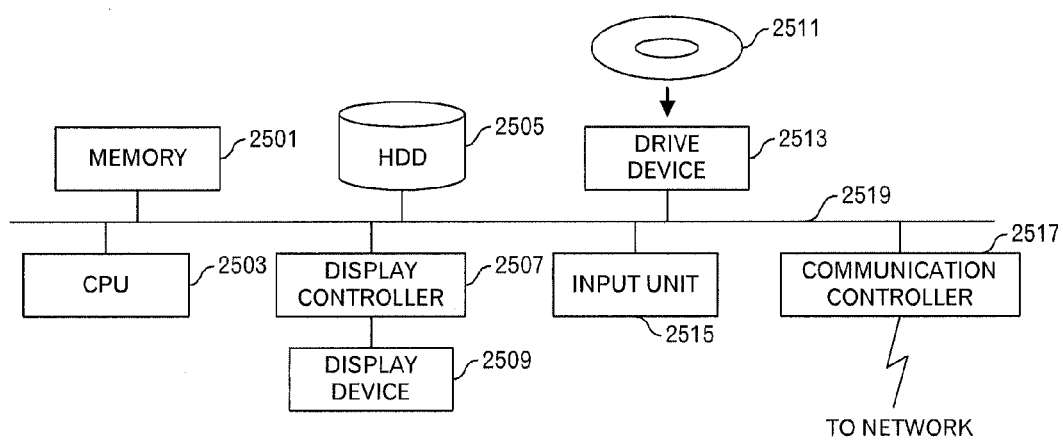
FIG. 41 is a functional block diagram of a computer.

In addition, the parameter correction apparatus is a computer device as shown in FIG. 41. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 41. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The embodiments described above are outlined as follows:

A parameter correction method relating to a first aspect of the embodiments includes: (A) obtaining, from a variability-aware simulation, a simulation result value of a predetermined product performance with respect to a reference candidate value set concerning statistics of predetermined product characteristics, and storing the obtained simulation result value into a data storage device; (B) calculating a likelihood by substituting the reference candidate value set, the obtained simulation result value, statistics of measurement values of the predetermined product characteristics and a measurement value of the predetermined product performance, which are stored in the data storage unit, into a likelihood function that is defined from a probability density function for the statistics of the predetermined product characteristics and a probability density function for the predetermined product performance, and is a function to calculate a combined likelihood of the statistics of the predetermined product characteristics and the predetermined product performance, and storing the calculated likelihood into the data storage unit; and (C) searching for a reference candidate value set in case where the calculated likelihood becomes maximum, by carrying out the obtaining and storing and the calculating and storing a plurality of times while changing the reference candidate value set.

By carrying out such a processing, the reference candidate value of the statistics of the predetermined product characteristics is identified so as to maximize a combined likelihood of the statistics of the predetermined product characteristics and the predetermined product characteristics. Namely, it becomes possible to obtain an entirely appropriate reference candidate value.

Moreover, the aforementioned searching may include: calculating a slope of the likelihood at a neighborhood of the reference candidate value set; and generating a new reference candidate value set by modifying the reference candidate value set so as to increase the likelihood according to the slope of the likelihood. By adopting such a method, it becomes possible to search for the maximum likelihood at high speed.

A parameter correction method relating to a second aspect of the embodiment includes: (A) first calculating, for each of a plurality of manufacturing measurement condition sets stored in a data storage unit, each candidate value of each parameter among a plurality of parameters that are statistics of predetermined product characteristics, based each of relational expressions, each the relational expression representing a relationship between the corresponding manufacturing measurement condition set and one parameter of the plurality of parameters, and storing the candidate values of the plurality of parameters, which are calculated for the corresponding manufacturing measurement condition set, into the data storage unit; (B) obtaining, from a variability-aware simulation, a simulation result value of a predetermined product performance with respect to the candidate values of the plurality of parameters, which are stored in the data storage unit in association with each of the manufacturing measurement condition sets, and storing the simulation result values into the data storage unit; (C) second calculating a likelihood by substituting the candidate values of the plurality of parameters for the respective manufacturing measurement condition sets, the simulation result values of the respective manufacturing measurement condition sets, the statistics of measurement values of the predetermined product characteristics for the respective manufacturing measurement condition sets and measurement values of the predetermined product performance for the respective manufacturing measurement condition sets into a likelihood function that is defined by unifying, for the plurality of manufacturing measurement condition sets, respective probability density functions for the respective parameters and a probability density function for the predetermined product performance and is a function to calculate a combined likelihood of the respective parameters and the predetermined product performance for the plurality of manufacturing measurement condition sets, and storing the calculated likelihood into the data storage unit; and (D) searching for respective relational expressions for each of the manufacturing measurement condition sets in case where the likelihood becomes maximum by carrying out the first calculating and storing, the obtaining and storing and the second calculating and storing a plurality of times, while changing the respective relational expressions for each of the manufacturing measurement condition sets.

Thus, even when the plural manufacturing measurement conditions exist, the aforementioned relational expressions maximizing the likelihood, which takes into account all of the manufacturing measurement conditions, can be identified. Then, it becomes possible to determine appropriate parameter values for each manufacturing measurement condition from the relational expressions.

Incidentally, the aforementioned relational expression may include a sum of a first coefficient and products of corresponding second coefficients and manufacturing measurement condition values included in the manufacturing measurement condition set. In such a case, the searching may include, for each of the manufacturing measurement condition sets, (d1) calculating, for each of the first coefficient and the second coefficients, the slope of the likelihood at a neighborhood; and (d2) generating a new first coefficient and new second coefficients by modifying the first coefficient and the second coefficients so as to increase the likelihood according to the slope of the likelihood. By adopting such a method, it becomes possible to search for the maximum likelihood at high speed.

Figure 42:
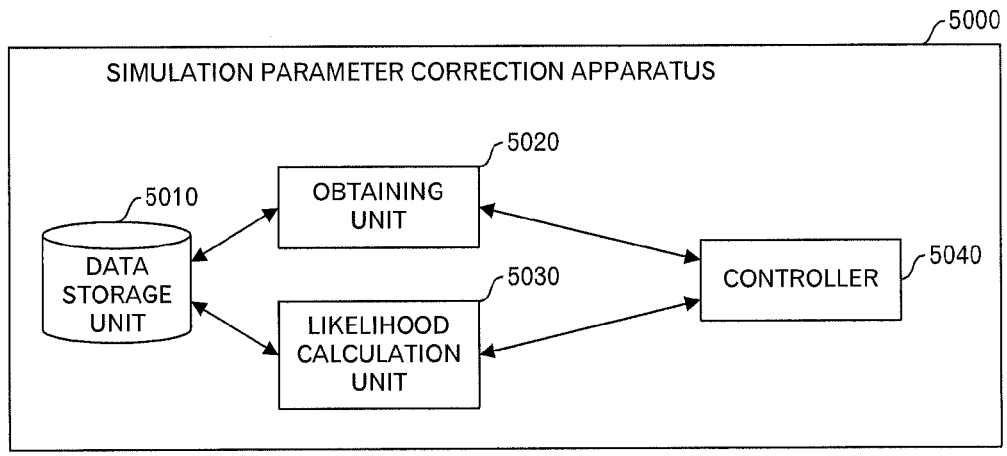
FIG. 42 is a functional block diagram of a simulation parameter correction apparatus.

A simulation parameter correction apparatus (FIG. 42: 5000) relating to a third aspect of the embodiments, includes: (A) an obtaining unit (FIG. 42: 5020) to obtain, from a variability-aware simulation, a simulation result value of a predetermined product performance with respect to a reference candidate value set concerning statistics of predetermined product characteristics, and to store the obtained simulation result value into a data storage unit (FIG. 42: 5010); a likelihood calculation unit (FIG. 42: 5030) to calculate a likelihood by substituting the reference candidate value set, the obtained simulation result value, statistics of measurement values of the predetermined product characteristics and a measurement value of the predetermined product performance, which are stored in the data storage unit, into a likelihood function that is defined from a probability density function for the statistics of the predetermined product characteristics and a probability density function for the predetermined product performance, and is a function to calculate a combined likelihood of the statistics of the predetermined product characteristics and the predetermined product performance, and to store the calculated likelihood into the data storage unit; and a controller (FIG. 42: 5040) to search for a reference candidate value set in case where the calculated likelihood becomes maximum, by causing the obtaining unit and the likelihood calculation unit to operate a plurality of times while changing the reference candidate value set.

Figure 43:
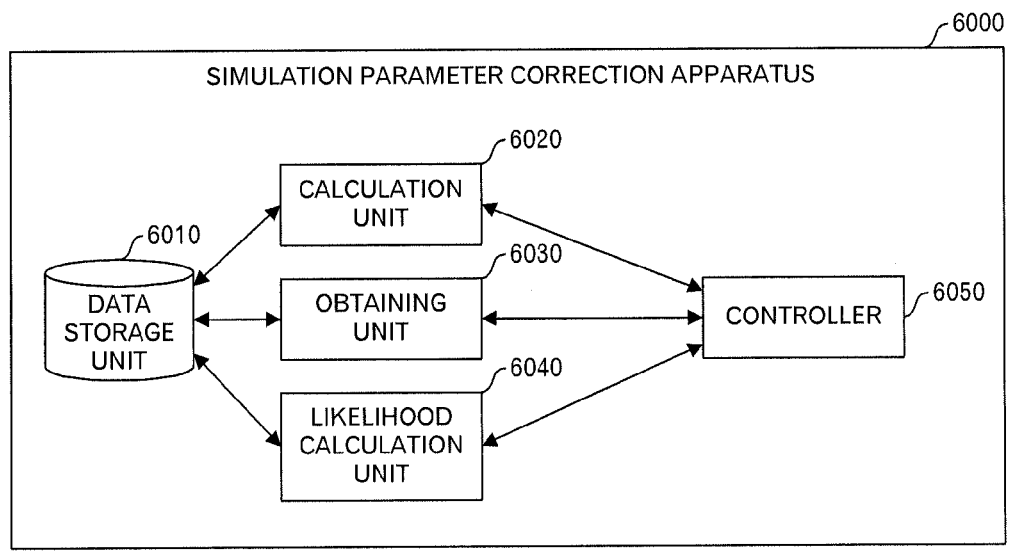
FIG. 43 is a functional block diagram of a simulation parameter correction apparatus.

A simulation parameter correction apparatus (FIG. 43: 6000) relating to a fourth aspect of the embodiment includes: (A) a first calculation unit (FIG. 43: 6020) to calculate, for each of a plurality of manufacturing measurement condition sets stored in a data storage unit (FIG. 43: 6010), each candidate value of each parameter among a plurality of parameters that are statistics of predetermined product characteristics, based each of relational expressions, each the relational expression representing a relationship between the corresponding manufacturing measurement condition set and one parameter of the plurality of parameters, and to store the candidate values of the plurality of parameters, which are calculated for the corresponding manufacturing measurement condition set, into the data storage unit; (B) an obtaining unit (FIG. 43: 6030) to obtain, from a variability-aware simulation, a simulation result value of a predetermined product performance with respect to the candidate values of the plurality of parameters, which are stored in the data storage unit in association with each of the manufacturing measurement condition sets, and to store the simulation result values into the data storage unit; (C) a likelihood calculation unit (FIG. 43: 6040) to calculate a likelihood by substituting the candidate values of the plurality of parameters for the respective manufacturing measurement condition sets, the simulation result values of the respective manufacturing measurement condition sets, the statistics of measurement values of the predetermined product characteristics for the respective manufacturing measurement condition sets and measurement values of the predetermined product performance for the respective manufacturing measurement condition sets into a likelihood function that is defined by unifying, for the plurality of manufacturing measurement condition sets, respective probability density functions for the respective parameters and a probability density function for the predetermined product performance and is a function to calculate a combined likelihood of the respective parameters and the predetermined product performance for the plurality of manufacturing measurement condition sets, and to store the calculated likelihood into the data storage unit; and (D) a controller (FIG. 43: 6050) to search for respective relational expressions for each of the manufacturing measurement condition sets in case where the likelihood becomes maximum by causing the first calculation unit, the obtaining unit and the second calculation unit to operate a plurality of times, while changing the respective relational expressions for each of the manufacturing measurement condition sets.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a process comprising:

first calculating, for each of a plurality of manufacturing measurement condition sets stored in a data storage unit, each candidate value of each parameter among a plurality of parameters that are statistics of predetermined product characteristics, based on of relational expressions, wherein each of the relational expressions represents a relationship between a corresponding manufacturing measurement condition set and one parameter of the plurality of parameters, and storing the candidate values of the plurality of parameters, which are calculated for the corresponding manufacturing measurement condition set, into the data storage unit;

obtaining, from a variability-aware simulation, a simulation result value of a predetermined product performance with respect to the candidate values of the plurality of parameters, which are stored in the data storage unit in association with each of the manufacturing measurement condition sets, and storing the simulation result values into the data storage unit;

second calculating a likelihood by substituting the candidate values of the plurality of parameters for the respective manufacturing measurement condition sets, the simulation result values of the respective manufacturing measurement condition sets, the statistics of measurement values of the predetermined product characteristics for the respective manufacturing measurement condition sets and measurement values of the predetermined product performance for the respective manufacturing measurement condition sets into a likelihood function that is defined by unifying, for the plurality of manufacturing measurement condition sets, respective probability density functions for the respective parameters and a probability density function for the predetermined product performance and is a function to calculate a combined likelihood of the respective parameters and the predetermined product performance for the plurality of manufacturing measurement condition sets, and storing the calculated likelihood into the data storage unit; and searching for respective relational expressions for each of the manufacturing measurement condition sets in case where the likelihood becomes maximum by carrying out the first calculating and storing, the obtaining and storing and the second calculating and storing a plurality of times, while changing the respective relational expressions for each of the manufacturing measurement condition sets.

2. The computer-readable, non-transitory storage medium as set forth in claim 1, wherein the relational expression includes a sum of a first coefficient and products of corresponding second coefficients and manufacturing measurement condition values included in the manufacturing measurement condition set, and the searching comprises, for each of the manufacturing measurement condition sets, calculating, for each of the first coefficient and the second coefficients, a slope of the likelihood at a neighborhood; and generating a new first coefficient and new second coefficients by modifying the first coefficient and the second coefficients so as to increase the likelihood according to the slope of the likelihood.

3. A method for correcting simulation parameters, the method comprising:

first calculating, by using a computer, for each of a plurality of manufacturing measurement condition sets stored in a data storage unit, each candidate value of each parameter among a plurality of parameters that are statistics of predetermined product characteristics, based on each of relational expressions, wherein each of the relational expressions represents a relationship between a corresponding manufacturing measurement condition set and one parameter of the plurality of parameters, and storing, by using the computer, the candidate values of the plurality of parameters, which are calculated for the corresponding manufacturing measurement condition set, into the data storage unit;

obtaining, by using the computer, from a variability-aware simulation, a simulation result value of a predetermined product performance with respect to the candidate values of the plurality of parameters, which are stored in the data storage unit in association with each of the manufacturing measurement condition sets, and storing, by using the computer, the simulation result values into the data storage unit;

second calculating, by using the computer, a likelihood by substituting the candidate values of the plurality of parameters for the respective manufacturing measurement condition sets, the simulation result values of the respective manufacturing measurement condition sets, the statistics of measurement values of the predetermined product characteristics for the respective manufacturing measurement condition sets and measurement values of the predetermined product performance for the respective manufacturing measurement condition sets into a likelihood function that is defined by unifying, for the plurality of manufacturing measurement condition sets, respective probability density functions for the respective parameters and a probability density function for the predetermined product performance and is a function to calculate a combined likelihood of the respective parameters and the predetermined product performance for the plurality of manufacturing measurement condition sets, and storing, by using the computer, the calculated likelihood into the data storage unit; and searching, by using the computer, for respective relational expressions for each of the manufacturing measurement condition sets in case where the likelihood becomes maximum by carrying out the first calculating and storing, the obtaining and storing and the second calculating and storing a plurality of times, while changing the respective relational expressions for each of the manufacturing measurement condition sets.

4. A simulation parameter correction apparatus comprising:

a first calculation unit to calculate, for each of a plurality of manufacturing measurement condition sets stored in a data storage unit, each candidate value of each parameter among a plurality of parameters that are statistics of predetermined product characteristics, based on each of relational expressions, wherein each of the relational expressions represents a relationship between a corresponding manufacturing measurement condition set and one parameter of the plurality of parameters, and to store the candidate values of the plurality of parameters, which are calculated for the corresponding manufacturing measurement condition set, into the data storage unit;

an obtaining unit to obtain, from a variability-aware simulation, a simulation result value of a predetermined product performance with respect to the candidate values of the plurality of parameters, which are stored in the data storage unit in association with each of the manufacturing measurement condition sets, and to store the simulation result values into the data storage unit;

a likelihood calculation unit to calculate a likelihood by substituting the candidate values of the plurality of parameters for the respective manufacturing measurement condition sets, the simulation result values of the respective manufacturing measurement condition sets, the statistics of measurement values of the predetermined product characteristics for the respective manufacturing measurement condition sets and measurement values of the predetermined product performance for the respective manufacturing measurement condition sets into a likelihood function that is defined by unifying, for the plurality of manufacturing measurement condition sets, respective probability density functions for the respective parameters and a probability density function for the predetermined product performance and is a function to calculate a combined likelihood of the respective parameters and the predetermined product performance for the plurality of manufacturing measurement condition sets, and to store the calculated likelihood into the data storage unit; and a controller to search for respective relational expressions for each of the manufacturing measurement condition sets in case where the likelihood becomes maximum by causing the first calculation unit, the obtaining unit and the second calculation unit to operate a plurality of times, while changing the respective relational expressions for each of the manufacturing measurement condition sets.

5. A simulation parameter correction apparatus comprising:

a processor configured to execute a process comprising:

first calculating, for each of a plurality of manufacturing measurement condition sets stored in a data storage unit, each candidate value of each parameter among a plurality of parameters that are statistics of predetermined product characteristics, based on each of relational expressions, wherein each of the relational expressions represents a relationship between a corresponding manufacturing measurement condition set and one parameter of the plurality of parameters, and storing the candidate values of the plurality of parameters, which are calculated for the corresponding manufacturing measurement condition set, into the data storage unit;

obtaining, from a variability-aware simulation, a simulation result value of a predetermined product performance with respect to the candidate values of the plurality of parameters, which are stored in the data storage unit in association with each of the manufacturing measurement condition sets, and storing the simulation result values into the data storage unit;

second calculating a likelihood by substituting the candidate values of the plurality of parameters for the respective manufacturing measurement condition sets, the simulation result values of the respective manufacturing measurement condition sets, the statistics of measurement values of the predetermined product characteristics for the respective manufacturing measurement condition sets and measurement values of the predetermined product performance for the respective manufacturing measurement condition sets into a likelihood function that is defined by unifying, for the plurality of manufacturing measurement condition sets, respective probability density functions for the respective parameters and a probability density function for the predetermined product performance and is a function to calculate a combined likelihood of the respective parameters and the predetermined product performance for the plurality of manufacturing measurement condition sets, and storing the calculated likelihood into the data storage unit; and searching for respective relational expressions for each of the manufacturing measurement condition sets in case where the likelihood becomes maximum by carrying out the first calculating and storing, the obtaining and storing and the second calculating and storing a plurality of times, while changing the respective relational expressions for each of the manufacturing measurement condition sets.

* * * * *

UNITED STATES PATENT AND TRADEMARK OFFICE
CERTIFICATE OF CORRECTION

PATENT NO. : 8,713,489 B2
APPLICATION NO. : 13/052243
DATED : April 29, 2014
INVENTOR(S) : Hiroyuki Higuchi et al.

It is certified that error appears in the above-identified patent and that said Letters Patent is hereby corrected as shown below:

In the Claims

Column 17, Line 37, in Claim 1, delete "based on of" and insert -- based on each of --, therefor.
Column 20, Line 1, in Claim 4, delete "the second calculation unit" and insert -- the likelihood calculation unit --, therefor.

Signed and Sealed this
Twenty-second Day of July, 2014

Michelle K. Lee
*Deputy Director of the United States Patent and Trademark Office*